(12) United States Patent
Taylor et al.

(10) Patent No.: US 8,863,018 B2
(45) Date of Patent: Oct. 14, 2014

(54) SYSTEM AND METHOD FOR FILTER CREATION AND USE FOR BUILDING AUTOMATION SYSTEMS

(75) Inventors: Jeffrey Taylor, Glendale, WI (US); Diana St. John, Germantown, WI (US); David S. Eidson, Franklin, WI (US); Gregory B. Cebasek, New Berlin, WI (US); Beth A. Ray, Oak Creek, WI (US); Radu Dorneanu, Greendale, WI (US); David E. Rasmussen, Dousman, WI (US)

(73) Assignee: Johnson Controls Technology Company, Holland, MI (US)

( * ) Notice: Subject to any disclaimer, the term of this patent is extended or adjusted under 35 U.S.C. 154(b) by 1844 days.

(21) Appl. No.: 12/021,180

(22) Filed: Jan. 28, 2008

(65) Prior Publication Data

US 2008/0209342 A1    Aug. 28, 2008

Related U.S. Application Data

(60) Provisional application No. 60/897,983, filed on Jan. 29, 2007.

(51) Int. Cl.
*G06F 3/048* (2013.01)
*H04L 12/28* (2006.01)
*G06F 3/0484* (2013.01)
*G05B 15/02* (2006.01)

(52) U.S. Cl.
CPC ............ *H04L 12/282* (2013.01); *G06F 3/0484* (2013.01); *G05B 15/02* (2013.01); *H04L 12/2827* (2013.01); *H04L 12/283* (2013.01)
USPC ................ 715/771; 715/747; 700/29; 700/83

(58) Field of Classification Search
USPC .............................. 715/747, 771; 700/29, 83
See application file for complete search history.

(56) References Cited

U.S. PATENT DOCUMENTS 6,112,237 A * 8/2000 Donaldson et al. ........... 709/224
6,169,985 B1 * 1/2001 Almgren et al. ....................... 1/1
(Continued)

FOREIGN PATENT DOCUMENTS

| EP | 1345097 B1 | 9/2003 |
|---|---|---|
| WO | WO2008/094864 A2 | 8/2008 |
| WO | WO2008/094867 A2 | 8/2008 |

OTHER PUBLICATIONS

International Search Report and Written Opinion of International Patent No. PCT/US2008/052210, mailed Jul. 22, 2008, 14 pages.

(Continued)

*Primary Examiner* — Tuyetlien Tran
(74) *Attorney, Agent, or Firm* — Foley & Lardner LLP

(57) ABSTRACT

A system for filtering items to be displayed on a graphical user interface provided to a client and for interaction by a user, the graphical user interface for a building automation system, is provided. The system includes a processor and memory communicably coupled to the processor. The memory includes computer code for allowing the user to create a filter definition via a computer based form. The memory further includes computer code for saving the created filter definition to memory and computer code for applying the saved filter definition to a set of building automation system data items. The memory yet further includes computer code for generating the graphical user interface, the graphical user interface including results of the applied filter definition.

24 Claims, 18 Drawing Sheets

(56) References Cited

U.S. PATENT DOCUMENTS

| | | | |
|---|---|---|---|
| 6,380,957 B1* | 4/2002 | Banning | 715/828 |
| 6,925,586 B1* | 8/2005 | Perrella et al. | 714/57 |
| 7,047,092 B2 | 5/2006 | Wimsatt | |
| 7,308,323 B2 | 12/2007 | Kruk et al. | |
| 7,352,279 B2* | 4/2008 | Yu et al. | 340/517 |
| 2001/0025278 A1* | 9/2001 | Yourlo et al. | 707/2 |
| 2002/0196293 A1* | 12/2002 | Suppan et al. | 345/853 |
| 2003/0014429 A1* | 1/2003 | Heghe et al. | 707/200 |
| 2003/0088593 A1* | 5/2003 | Stickler | 707/205 |
| 2003/0176930 A1* | 9/2003 | Nold | 700/17 |
| 2004/0117330 A1* | 6/2004 | Ehlers et al. | 705/412 |
| 2004/0186927 A1* | 9/2004 | Eryurek et al. | 710/12 |
| 2004/0189707 A1* | 9/2004 | Moore et al. | 345/777 |
| 2004/0267385 A1* | 12/2004 | Lingemann | 700/83 |
| 2005/0044100 A1* | 2/2005 | Hooper et al. | 707/102 |
| 2005/0097478 A1* | 5/2005 | Killian et al. | 715/851 |
| 2005/0192953 A1* | 9/2005 | Neale et al. | 707/4 |
| 2005/0222861 A1* | 10/2005 | Silverman et al. | 705/1 |
| 2005/0267900 A1* | 12/2005 | Ahmed et al. | 707/100 |
| 2006/0010388 A1* | 1/2006 | Imhof et al. | 715/734 |
| 2006/0028212 A1* | 2/2006 | Steiner et al. | 324/527 |
| 2006/0047673 A1* | 3/2006 | Molander et al. | 707/101 |
| 2006/0052884 A1* | 3/2006 | Staples et al. | 700/83 |
| 2006/0058900 A1* | 3/2006 | Johanson et al. | 700/83 |
| 2006/0058922 A1 | 3/2006 | Kruk et al. | |
| 2006/0058923 A1* | 3/2006 | Kruk et al. | 700/275 |
| 2006/0161867 A1* | 7/2006 | Drucker et al. | 715/810 |
| 2006/0178898 A1* | 8/2006 | Habibi | 705/1 |
| 2006/0253205 A1* | 11/2006 | Gardiner | 700/19 |
| 2007/0055390 A1* | 3/2007 | Simon et al. | 700/19 |
| 2007/0061046 A1 | 3/2007 | Mairs et al. | |
| 2007/0067062 A1* | 3/2007 | Mairs et al. | 700/275 |
| 2007/0204239 A1 | 8/2007 | Ray et al. | |
| 2007/0219645 A1* | 9/2007 | Thomas et al. | 700/29 |
| 2007/0232288 A1 | 10/2007 | McFarland et al. | |
| 2008/0001735 A1* | 1/2008 | Tran | 340/539.22 |
| 2008/0222565 A1 | 9/2008 | Taylor et al. | |
| 2010/0057600 A1* | 3/2010 | Johansen et al. | 705/37 |

OTHER PUBLICATIONS

International Search Report and Written Opinion of International Patent No. PCT/US2008/052206, mailed Jul. 22, 2008, 13 pages.

U.S. Appl. No. 29/271,898, filed Jan. 29, 2007, Taylor et al.

Screen shots maintained by inventive team, believed to be available by Sep. 11, 2006, 25 pages.

Office Action for U.S. Appl. No. 12/021,186, dated Mar. 29, 2011, 20 pages.

Office Action for U.S. Appl. No. 12/021,186, dated Dec. 6, 2011, 13 pages.

* cited by examiner

FIG. 10C

Schedule Summary: Floor 2

| Item | Value | Sta | Path |
|---|---|---|---|
| OCC Schedule | On | | LG-NAE2.Control Systems.St... |
| Todays Peak Sche... | State 0 | | LG-NAE2.Control Systems.St... |
| This Weeks Peak S... | Release | | LG-NAE2.Control Systems.St... |
| This Month Peak S... | Release | | LG-NAE2.Control Systems.St... |
| This Years Peak Sc... | State 0 | | LG-NAE2.Control Systems.St... |
| Todays Totalizatio... | Release | | LG-NAE2.Control Systems.St... |
| This Weeks Totaliz... | Release | | LG-NAE2.Control Systems.St... |
| This Month Totaliz... | Release | | LG-NAE2.Control Systems.St... |
| This Years Totaliza... | Release | | LG-NAE2.Control Systems.St... |
| Norm Occ Schedule | Comfort | | LG-NAE2.Control Systems.St... |
| AHU Occupied Sch... | Occupied | | LG-NAE2.Control Systems.St... |
| AHU Warmup Sche... | Disable | | LG-NAE2.Control Systems.St... |
| Schedule1 | Release | | LG-NAE2.Permissions By Cate... |
| Schedule1 | Release | | LG-NAE2.Permissions By Cate... |

LG DEMO - School District
- LG DEMO - School District
  - Elson School
    - Floor 1
      - Library
      - Gym
      - Classroom 200
      - Classroom 201
      - Conference Room
      - Auditorium
      - Hallway
    - Floor 2
  - GR Elementary
    - Floor 1
    - Floor 2
      - LG-NAE2

1200

| | Save | Cancel | | Add Column | Remove Column |
|---|---|---|---|---|---|
| | | Temperature | Setpoint | Status | |
| Field Controllers | | Present Value | Present Value | Status | |
| VAV* | | ZN-T*, Zone-T* | ZN-S*, Zone-S* | | |
| FEC* | | HVAC, Security | HVAC, Security | | |

| | Attribute | Value | | |
|---|---|---|---|---|
| Include: | Field Controllers v | | | — 1202 |
| Criteria: | Item | Operator | Value | |
| | Name v | Matches v | VAV* | |
| | Name v | Matches v | FEC* | |
| 1204 | Object Category v | Equals v | HVAC v | |
| | Reference v | Contains v | FEC | |
| | Reference v | Contains v | VAV | |

| Save | Cancel | | Add Column | Remove Column |
|---|---|---|---|---|
| | Temperature | Setpoint | Status | |
| Field Controllers | Present Value | Present Value | Status | |
| VAV* | ZN-T*, Zone-T* | ZN-S*, Zone-S* | | 1260 |
| FEC* | HVAC, Security | HVAC, Security | | |

| | Attribute | Value | | |
|---|---|---|---|---|
| | | | | — 1252 |
| Column Label: | Temperature | | | |
| Criteria: | Item | Operator | Value | |
| | Attribute v | Equals v | Default v | |
| | Attribute v | Equals Custom String v | Custom Attr Name | |
| | Object Name v | Matches v | Zone-* | |
| 1254 | Object Name v | Matches v | ZN-T v | |

FIG. 12B

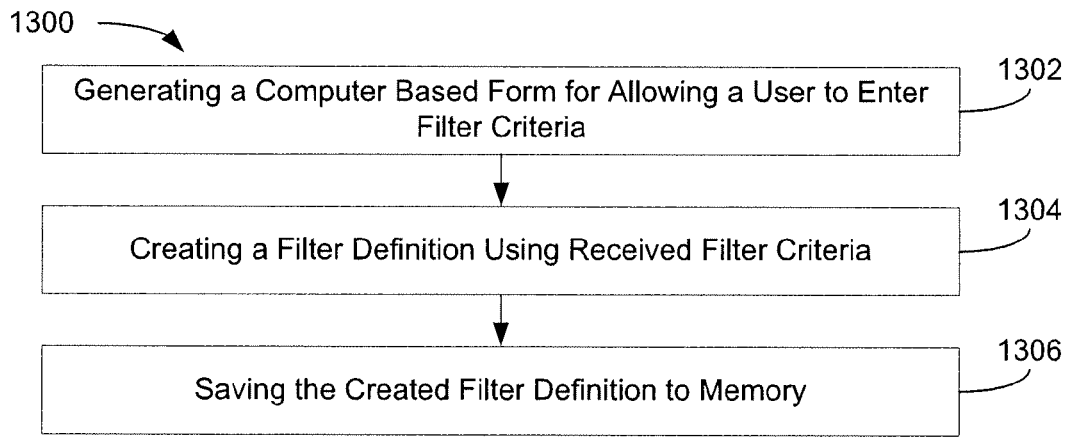

1300

Generating a Computer Based Form for Allowing a User to Enter Filter Criteria — 1302

Creating a Filter Definition Using Received Filter Criteria — 1304

Saving the Created Filter Definition to Memory — 1306

Providing an Interface to Associate a Filter with a Selected Building Space — 1352

Relating the Saved Filter to the Selected Building Space — 1354

Associating the Saved Filter with a Second Building Space — 1356

Providing an Interface for Allowing the User to Choose Between Automatic Application of the Filter Definition and a Standard Summary Associated with the Building Space — 1358

Copying the Filter Definition to a First Profile Associated with a First User and a Second Profile Associated with a Second User — 1360

Applying the Saved Filter Definition to a Set of Building Automation System Data Items — 1382

Generating a Graphical User Interface Including Results of the Applied Filter Definition — 1384

FIG. 13C

SYSTEM AND METHOD FOR FILTER CREATION AND USE FOR BUILDING AUTOMATION SYSTEMS

CROSS-REFERENCE TO RELATED APPLICATIONS

The present application claims the benefit of U.S. Provisional Patent Application No. 60/897,983 filed Jan. 29, 2007, the entire disclosure of which is incorporated by reference.

BACKGROUND

The present disclosure relates to controlling systems of a building, such as those which provide heating, ventilation, air conditioning, fire detection, and building access and security; and more particularly to a user interface for such building automation systems.

Large commercial and institutional buildings have several systems for controlling different aspects of the building operation. A heating, ventilation and air conditioning (HVAC) system manages components which control the interior environment of the building. A security system includes devices which limit access to the building to only individuals who possess a proper access code or access device, such as a key card. A fire detection system utilizes heat and smoke detectors located throughout the building to sense the occurrence of a fire and produce a warning of that event. Other systems may monitor and control lighting and other electrical loads for optimum energy conservation.

Building systems may be autonomous or networked together in an integrated system. In either case, the systems may be controlled by workstations at one or more locations within the building or at a remote location. Such workstations may be located at the manager's office, the building operating engineer's office, and/or at the security desk. When the building is part of a larger commercial or educational campus, the systems and networks for each building can be connected to a wide area communication network, the Internet, or some other network which enables control from a central campus facility management office or offsite location. Offsite communications may be accomplished with standard or proprietary wired or wireless telecommunications links.

Modern building automation systems may include a variety of user interface features that allow a user (e.g., building engineer, facility employee, manager, etc.) to view or control parameters or settings of various facility systems (e.g., HVAC, security, emergency, etc.). For example, a building automation system may include a computer application or browser interface configured to display the various hardware components of the HVAC system and the components' operating parameters. As various components or subsystems of building automation systems have become more connected and complicated, facilities management user interfaces and the systems that control the user interfaces have become complicated.

In many instances, a user of a typical building automation system must have highly detailed knowledge of the hardware design of the system he or she would like to control before being able to investigate a problem or develop a solution. Furthermore, in many instances the user is not presented with natural language or intuitive control options. Rather, users are typically required to navigate detailed hierarchies of information before they are presented with a screen that allows them to change a value (e.g., a scheduling parameter, a setpoint parameter, etc.). Even if a user is presented a screen for changing a value early in the navigation experience, the method for changing a value is typically cumbersome, especially for novice users that know the outcome they would like, but not necessarily the parameter names or other system design details.

There is a need for improved graphical user interfaces for building automation systems. Furthermore, there is a need for system configured to generate a graphical user interface that presents a user with task-based or outcome focused options for controlling the building automation system and/or devices thereof. Yet further, there is a need for a system configured to provide an intuitive and easy-to-understand method and associated graphical user interfaces for temporarily overriding a schedule and/or for changing a value.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the identified needs.

SUMMARY

One embodiment of the invention relates to a system for filtering items to be displayed on a graphical user interface provided to a client and for interaction by a user, the graphical user interface for a building automation system. The system includes a processor and memory communicably coupled to the processor. The memory includes computer code for allowing the user to create a filter definition via a computer based form. The memory further includes computer code for saving the created filter definition to memory and computer code for applying the saved filter definition to a set of building automation system data items. The memory yet further includes computer code for generating the graphical user interface, the graphical user interface including results of the applied filter definition.

Another embodiment relates to a system for providing a method for filtering items to be displayed on a graphical user interface provided to a client and for interaction by a user, the graphical user interface for a building automation system. The method includes generating a computer based form and providing the computer based form to the user, the computer based form configured to allow the user to define filter criteria. The method further includes creating a filter definition using the filter criteria and saving the created filter definition to a memory device. The method further includes applying the saved filter definition to a set of building automation system data items and generating a graphical user interface, the graphical user interface including the results of the applied filter definition.

Another embodiment relates to a system for providing a graphical user interface to a user of a building automation system via a client, the building automation system including a building automation site director. The system includes a processor and memory communicably connected to the processor. The memory includes computer code for communicating with the client and computer code for communicating with the building automation site director. The memory further includes computer code for presenting a graphical user interface to the client, the graphical user interface configured to allow the user to select a function mode and a context via the client. The memory yet further includes computer code for determining a set of tasks to be provided to the graphical user interface based on the selected function mode and context and computer code for providing an update to the graphical user interface via the client, the update including user interface elements representing the tasks of the set of tasks.

Alternative exemplary embodiments relate to other features and combinations of features as may be generally recited in the claims.

BRIEF DESCRIPTION OF THE FIGURES

The application will become more fully understood from the following detailed description, taken in conjunction with the accompanying figures, wherein like reference numerals refer to like elements, in which:

FIG. 10C is a view of an updated user interface system of FIG. 10A, according to an exemplary embodiment;

FIG. 12A is a view of a system of configuring filter definitions, according to an exemplary embodiment;

FIG. 12B is a view of a system of configuring filter definitions, according to another exemplary embodiment;

FIG. 13A is a flow diagram of a method for creating and maintaining a filter definition for a building automation system, according to an exemplary embodiment;

FIG. 13B is a flow diagram of a method for supporting the filtering shown in FIG. 13A, according to an exemplary embodiment; and FIG. 13C is a flow diagram of a method of a UI server using a filter definition to provide a graphical user interface for a user, according to an exemplary embodiment.

DETAILED DESCRIPTION OF THE EXEMPLARY EMBODIMENTS

Before turning to the figures which illustrate the exemplary embodiments in detail, it should be understood that the application is not limited to the details or methodology set forth in the description or illustrated in the figures. It should be understood that the phraseology and terminology is for the purpose of description only and should not be regarded as limiting.

Referring generally to the FIGS., a graphical user interface (GUI) system and/or server for managing a building automation system is shown. The GUI system is configured to serve graphical user interfaces to client devices. The GUI system is configured to use data relating to the building automation system to generate the graphical user interfaces. According to an exemplary embodiment, the GUI system provides the user with access to user interface elements that trigger outcome-based tasks early in the user experience. According to another exemplary embodiment, the GUI system provides the user with a filter engine for creating customized filters, views, or summaries of information.

Figure 1:
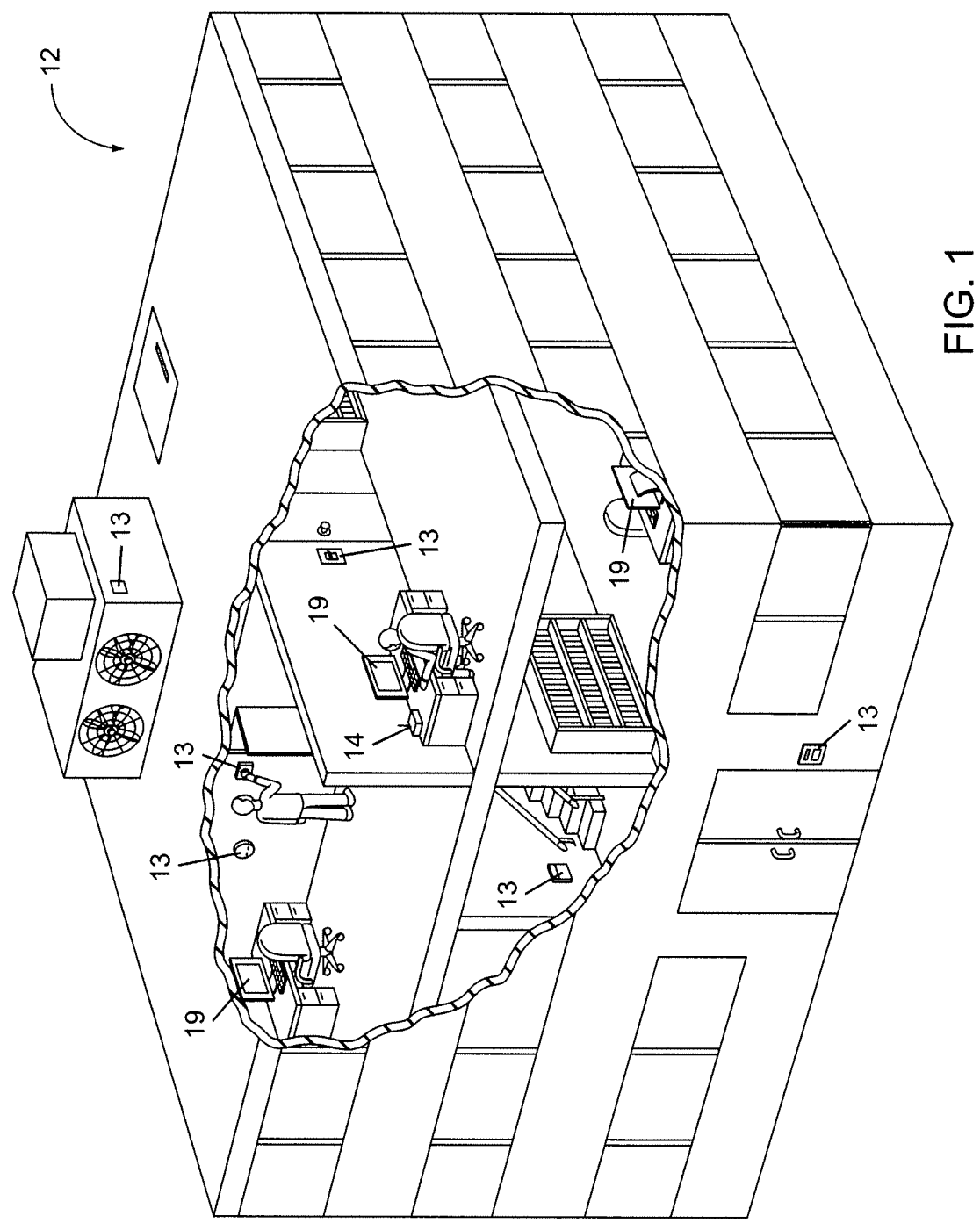
FIG. 1 is a perspective view of a building area having a plurality of building automation devices, according to an exemplary embodiment.
Figure 2:
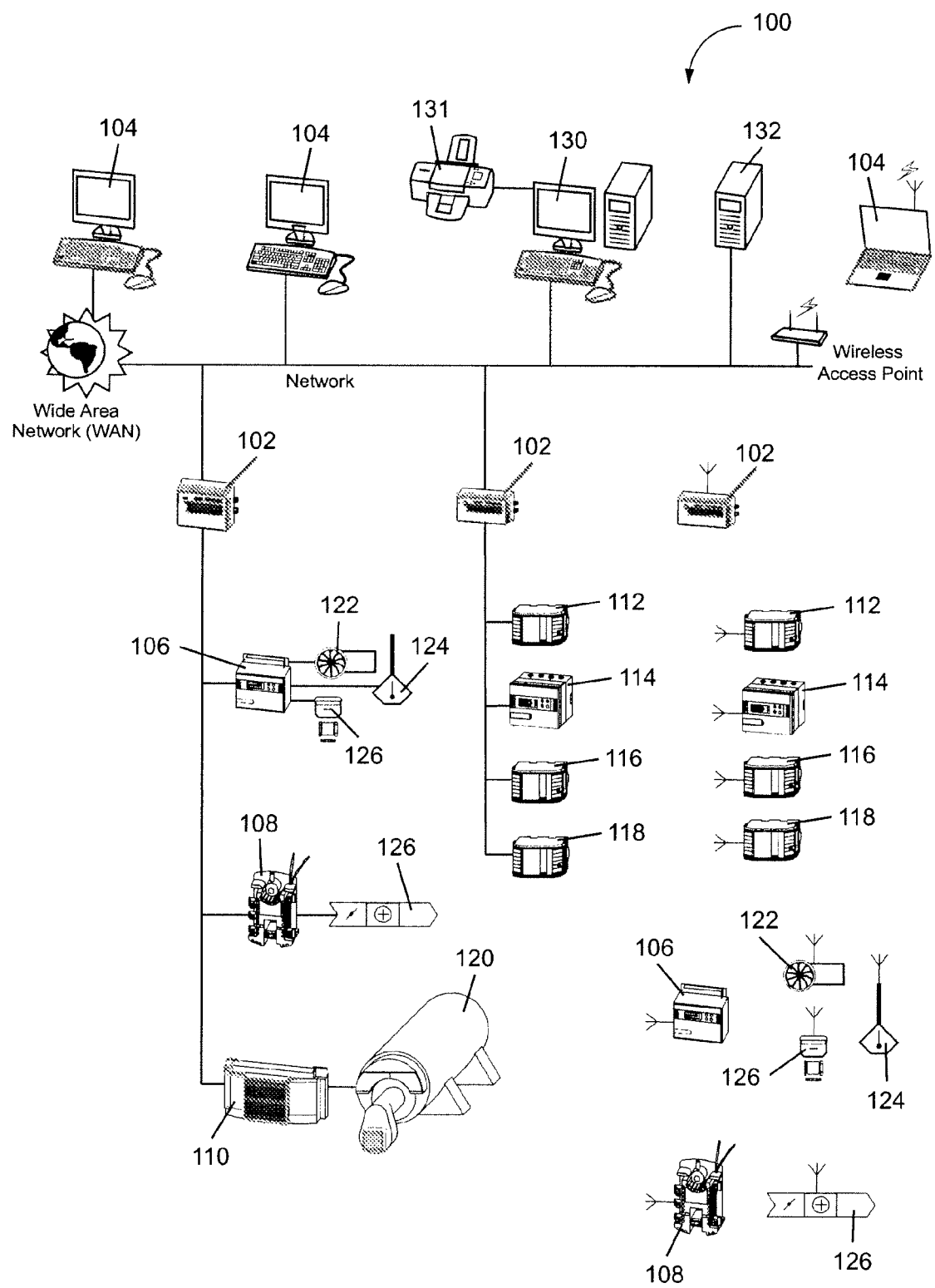
FIG. 2 is a schematic diagram of a building automation system for the building area of FIG. 1, according to an exemplary embodiment.

Referring now to FIGS. 1 and 2, FIGS. 1 and 2 illustrate an exemplary building automation system that may be used with the systems and methods described with subsequent FIGS.

FIG. 1 is a perspective view of a building 12 having a plurality of building devices 13 capable of transmitting and/or receiving control signals, according to an exemplary embodiment. As illustrated, building 12 may include any number of floors, rooms, spaces, zones, and/or other building structures and areas. According to various exemplary embodiments, building 12 may be any area of any size or type, including an outdoor area. Building devices 13 may exist inside or outside the building, on walls or on desks, be user interactive or not, and may be any type of building device. For example, building devices 13 may be a security device, a light switch, a fan actuator, a temperature sensor, a thermostat, a smoke detector, an occupancy sensor, other various types of sensors (flow, pressure, etc.), etc. Building devices 13 may be configured to conduct building automation functions (e.g., sense temperature, sense humidity, control a building management device, etc.). Building devices 13 may also serve any number of network functions (e.g., RF measuring functions, network routing functions, etc.). A controller system 14 may be a wired or wireless device for assisting with control of building devices 13. Controller system 14 may serve as a site director, network coordinator, building device controller, wireless access point, router, switch, hub, and/or serve as another node on a network. A workstation 19 is shown as a personal workstation. Workstation 19 may allow building engineers to interact with controller system 14. Building devices 13 may be connected to controller system 14 and/or workstation 19 via a wired and/or wireless connection.

Building automation systems (BAS) are, in general, hardware and/or software systems configured to control, monitor, and manage equipment in or around a building or building area. BAS equipment can include a heating, ventilation, and air conditioning (HVAC) system, a security system, a lighting system, a fire alerting system, an elevator system, another system that is capable of managing building functions, or any combination thereof. The BAS as illustrated and discussed in the present disclosure is an example of a facility system that may be used in conjunction with the systems and methods disclosed, however, other facility systems may be used as well. According to other exemplary embodiments, the systems and methods of the present disclosure may be used in conjunction with any type of system (e.g., a general purpose office local area network (LAN), a home LAN, a wide area network (WAN), a wireless hotspot, etc.).

Referring to FIG. 2, a schematic diagram of a BAS 100 that may be used with the systems and methods of the present disclosure is shown, according to an exemplary embodiment. BAS 100 may include one or more network automation engines (NAEs) 102 connected to a proprietary or standard communications network such as an IP network (e.g., Ethernet, WiFi, ZigBee, Bluetooth, etc.). NAEs 102 may support various field-level communications protocols and/or technology, including various Internet Protocols (IP), BACnet over IP, BACnet Master-Slave/Token-Passing (MS/TP), N2 Bus, N2 over Ethernet, Wireless N2, LonWorks, ZigBee, and any number of other standard or proprietary field-level building management protocols and/or technologies. NAEs 102 may include varying levels of supervisory features and building management features. The user interface of NAEs 102 may be accessed via terminals 104 (e.g., client devices, web browser terminals) capable of communicably connecting to and accessing NAEs 102. For example, FIG. 2 shows multiple terminals 104 that may variously connect to NAEs 102 or other devices of BAS 100. For example, terminals 104 may access BAS 100 and connected NAEs 102 via a WAN, local IP network, or via a connected wireless access point. Terminals 104 may also access BAS 100 and connected NAEs 102 to provide information to another source, such as printer 131. User interface (UI) server 132 may also be included in BAS 100 coupled to the network.

NAEs 102 may be connected to any number of BAS devices. The devices may include, among other devices, devices such as field-level control modules 106, variable air volume modular assemblies (VMAs) 108, integrator units 110, variable air volume (VAV) devices and units 112, extended digital controllers 114, unitary devices 116, air handling unit (AHU) controllers 118, boilers 120, fan coil units 122, heat pump units 124, unit ventilators 126, expansion modules, blowers, temperature sensors, flow transducers, other sensors, motion detectors, actuators, dampers, heaters, air conditioning units, etc. These devices may generally be controlled and/or monitored by NAEs 102. Data generated by or available on the various devices that are directly or indirectly connected to an NAE 102 may be passed, sent, requested, or read by NAE 102 and/or sent to various other systems or terminals of BAS 100. The data may be stored by NAE 102, processed by NAE 102, transformed by NAE 102, and/or sent to various other systems or terminals of the BAS 100. As shown in FIG. 2, the various devices of BAS 100 may be connected to NAE 102 with a wired connection or with a wireless connection.

Still referring to FIG. 2, an application and data server (ADS) 130 is shown, according to an exemplary embodiment. ADS 130 is a server system that includes a database management system (e.g., a relational database management system, Microsoft SQL Server, SQL Server Express, etc.) and server software (e.g., web server software, application server software, virtual machine runtime environments, etc.) that provide access to data and routes commands to the BAS. For example, ADS 130 may serve user interface applications. ADS 130 may also serve applications such as Java applications, messaging applications, trending applications, database applications, etc. ADS 130 may store trend data, audit trail messages, alarm messages, event messages, contact information, and/or any number of BAS-related data. Terminals may connect to ADS 130 to access the entire BAS 100 and historical data, trend data, alarm data, operator transactions, and any other data associated with BAS 100, its components, or applications. Various local devices such as printer 131 may be attached to components of BAS 100 such as ADS 130.

Various BAS configurations are possible. According to an exemplary embodiment one computing device of BAS 100 will serve as the site director for the rest of the BAS. The site director may be considered the head device or controlling device of a BAS. Depending on the scale and/or configuration of the BAS, different devices may be the site director. For example, in some large systems ADS 130 will control multiple NAEs 102 and their connected building devices (as shown in FIG. 2). In smaller or more simple systems, one NAE 102 may be the site director.

UI Server and Architecture

The site director is typically a machine and/or collection of hardware/software that includes workstation or power-user focused user interface software. According to the exemplary embodiments shown in FIGS. 3A and 3B a UI server is provided in addition to the BAS site director. The UI server is generally configured to provide intuitive graphical user interface views for less experienced users and experienced users alike.

Figure 3A:
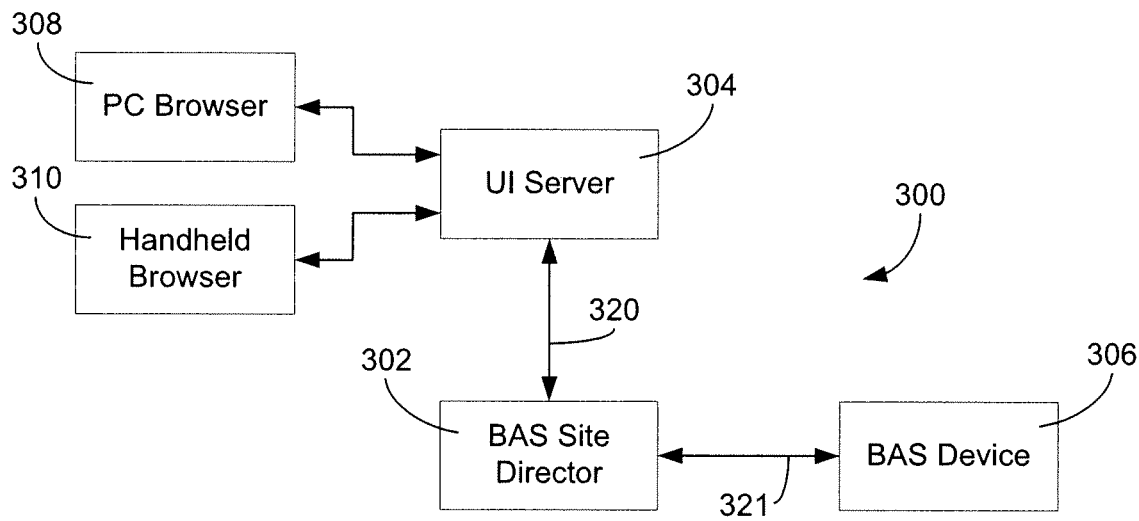
FIG. 3A is a block diagram of a user interface (UI) server and external site director, according to an exemplary embodiment.

Referring to FIG. 3A, a block diagram of a system 300 of a UI server and external site director is shown, according to an exemplary embodiment. UI server 304 may be part of BAS 100 of FIG. 2 (e.g., UI server 132 of FIG. 2). BAS device 306 may be any type of device, for example, any of the devices 102 through 126 of FIG. 2. BAS site director 302 may be ADS 130 or NAE 102 of BAS 100 shown in FIG. 2. According to one exemplary embodiment, UI server 304 and BAS site director 302 may communicate via network 320 and BAS site director 302 and BAS device 306 may communicate via network 321. Networks 320 and 321 may consist of a wired or wireless connection and may be any type of network or any number of networks. Networks 320 and 321 may be the same network, according to an exemplary embodiment.

UI server 304 is configured for communications with various client devices. For example, personal computer (PC) browser 308 and handheld browser 310 are shown communicably coupled to UI server 304. Browser 308 may be on a PC or other computing device having full screen size graphics capabilities (e.g., terminals 104 of FIG. 2), and handheld browser 310 may be on a personal digital assistant (PDA), cellular phone, or any other such device. Device browsers 308 and 310 may communicate with UI server 304 either via a wired or wireless connection. UI server 304 is configured to provide graphical user interfaces to a user via client devices/software 308, 310. The graphical user interfaces provided by UI server 304 relate to monitoring and/or control of BAS devices 306 and/or of BAS site director 302. UI server 304 is generally configured to access BAS site director 302 to obtain, retrieve, or access content for use in the generation of its graphical user interfaces.

The graphical user interfaces provided to PC browser 308, handheld browser 310, or a browser on another client device may be used to perform various tasks by accepting a user input and providing the input to UI server 304 for the BAS.

UI server 304 may be configured to provide a graphical user interface that includes features for viewing summaries of BAS devices, settings, values, schedules, and the like. UI server 304 may further provide a graphical user interface that includes features for changing setpoint values or other values. The provided graphical user interfaces may provide mechanisms configured to allow a user to adjust BAS values and states, enable operator override commands, release operator override commands, view alert summaries, perform basic alert tasks (e.g., acknowledge, discard, etc.), view schedule summaries, view schedule details (e.g., a scheduled point summary, "today's schedule", a temporary override list, etc.), perform basic schedule tasks (e.g., temporary override of a scheduled task, etc.), view trend summaries, view trend details such as trend sample data for a limited timeframe, etc. The graphical user interfaces provided to a PC browser and/or a handheld browser may contain different content in addition to being sized differently. For example, some features that may be provided to the PC browser interface may not be provided to the handheld browser, and vise versa. The features provided to the PC browser and/or the handheld browser may depend upon the nature of the task requested or performed. Some features may be exclusive for specific groups of users (e.g., administrators may be allowed to access more features than other users).

Figure 3B:
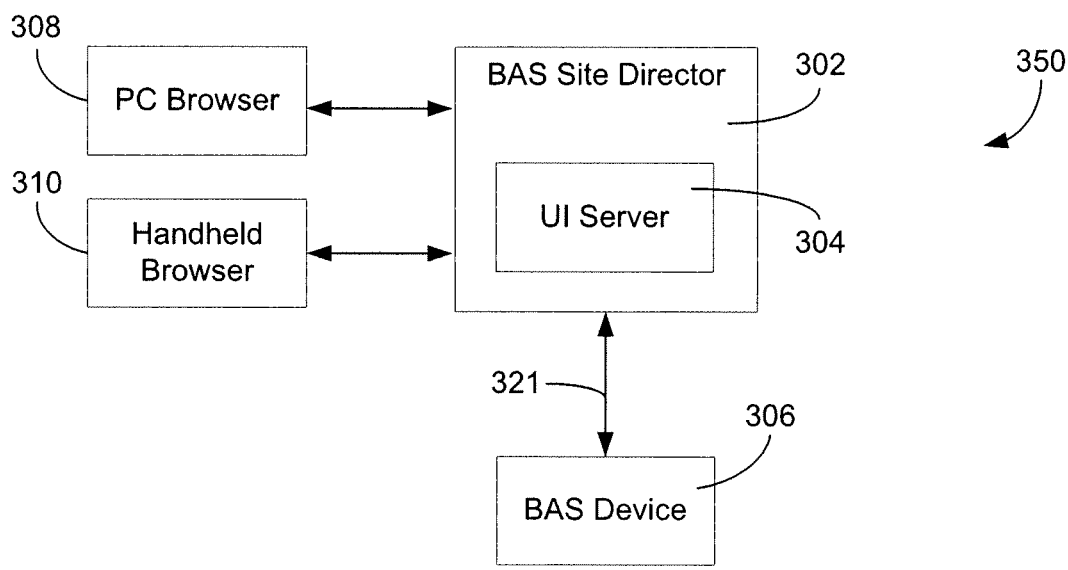
FIG. 3B is a block diagram of a UI server integral with an external site director, according to an exemplary embodiment.

Referring to FIG. 3B, a block diagram of a system 350 of a UI server integral with a site director is shown, according to an exemplary embodiment. System 350 may have the general functionality of system 300 of FIG. 3A. In the embodiment shown in FIG. 3B, however, UI server 304 is shown as a software residing on or in BAS site director 302 instead of being a separate hardware and software device. According to the exemplary embodiment shown in FIG. 3B, computer code for BAS site director 302 and computer code for UI server 304 is located in physical memory of the same computing device (e.g., an NAE or ADS of the BAS as described in FIG. 2). In the embodiment shown in FIG. 3A, UI server 304 is installed on a device (e.g., PC, server class machine, etc.) separate from BAS site director 302. According to an alternative exemplary embodiment, UI server 304 may be installed across multiple BAS machines, standalone machines (e.g., PCs), and/or other platforms.

Figure 4:
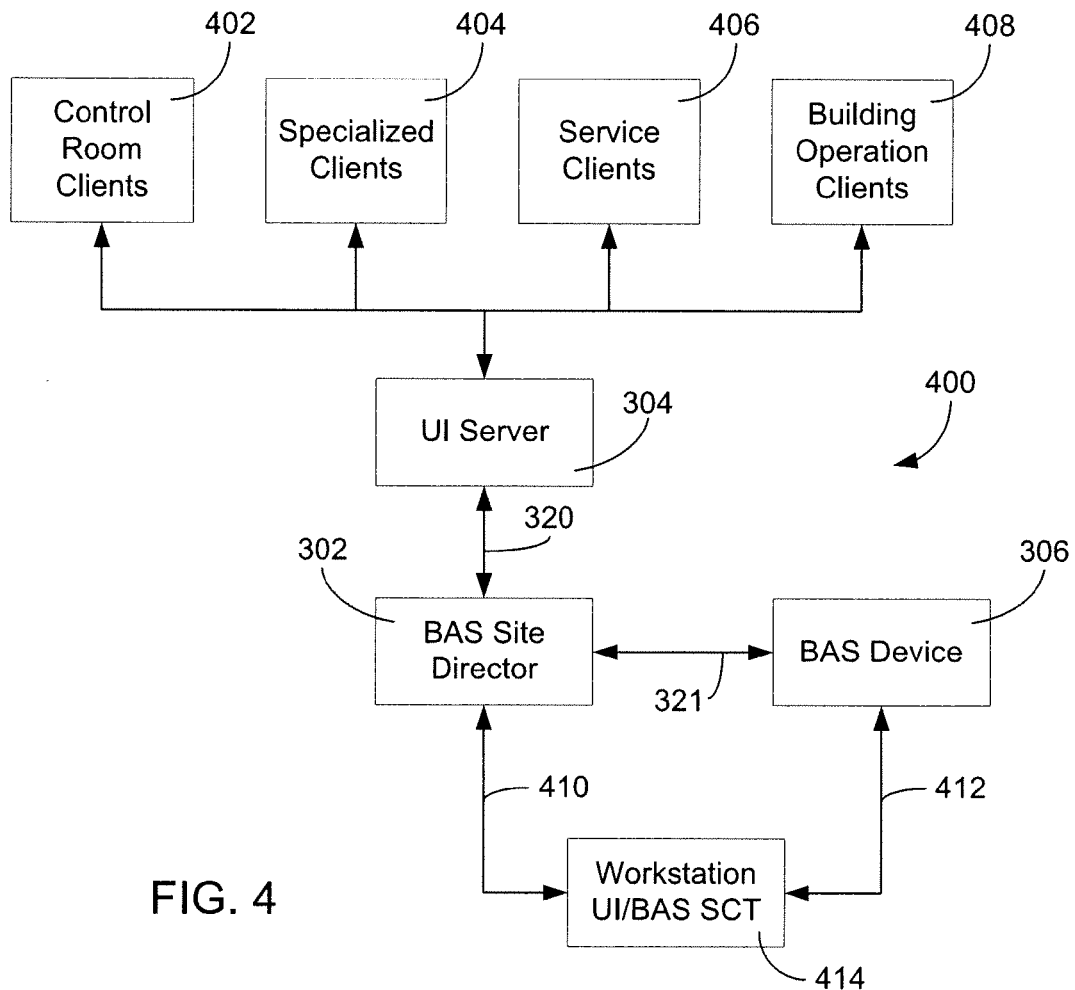
FIG. 4 is a block diagram of a building automation system (BAS) shown with interaction with a variety of client types, according to an exemplary embodiment.

Referring to FIG. 4, a block diagram of a system 400 is shown, according to an exemplary embodiment. UI server 304 may be configured to serve graphical user interfaces to a variety of client and/or user types. For example, control room clients 402, specialized clients 404, service clients 406, and building operation clients 408 are illustrated as examples of clients that may be in communication with UI server 304, either via a wired or wireless connection. Clients 402-408 may be or include PC devices, kiosk devices, handheld devices, portable devices, mobile phone devices, or any other computing device that may be configured to operatively communicate with UI server 304. Tasks and operations that may be requested and performed by clients 402-408 may include, but are not limited to, navigating and monitoring hierarchies of BAS devices, adjusting and commanding setpoints or other values, modifying BAS schedules, managing alarms and warnings, and troubleshooting and diagnosing problems with the BAS.

BAS site director 302 and BAS device 306 may be in communication with workstation UI/BAS software configuration tool (SCT) 414. Workstation UI/BAS SCT 414 may be generated by software residing on BAS site director 302 and/or BAS device 306. Workstation UI/BAS SCT 414 may provide a graphical user interface that looks and behaves differently than the graphical user interface provided by UI server 304. Workstation UI/BAS SCT 414 may also provide graphical user interfaces for administration of BAS site director 302 and/or UI server 304. For example, workstation UI/BAS SCT 414 may provide graphical user interfaces for site configuration, user administration, online/advanced reporting, historical data analysis, detailed BAS device command and control, and/or site archive maintenance. Additional features of workstation UI/BAS SCT 414 may include maintenance or installation of UI server 304. A workstation interface 410 and 412 for BAS site director 302 and BAS device 306 may be configured to provide relevant information to workstation UI/BAS SCT 414. Workstation UI/BAS SCT 414 may be installed on the same computing device as UI server 304 and BAS site director 302, may be installed on BAS site director 302, or may be installed and/or executed on another machine.

Referring further to the block diagrams of FIGS. 1-4, it should be appreciated that any suitable past, present, or future technology for the communication of information may be utilized for communicating information between servers, clients, software modules, workstations, and the like. Standard and/or proprietary messaging protocols, transfer protocols, network protocols, and the like may be used by the systems.

Figure 5:
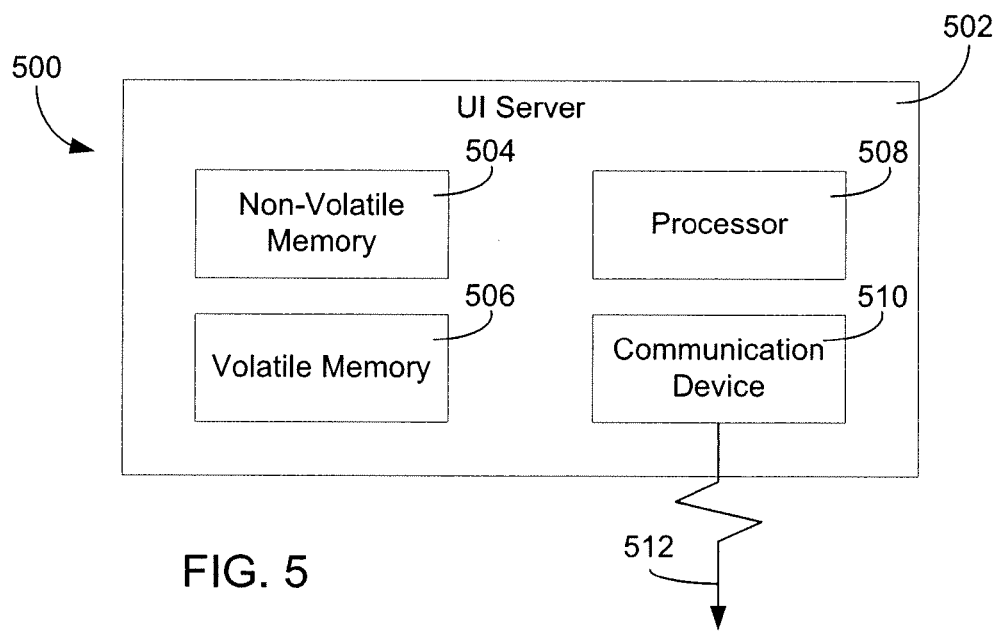
FIG. 5 is a more detailed block diagram of the hardware components of the UI server of FIGS. 3-4, according to an exemplary embodiment.

Referring to FIG. 5, a more detailed block diagram of a system 500 of the UI server of FIG. 3A is shown, according to an exemplary embodiment. UI server 502 includes a non-volatile memory 504, a volatile memory 506, a processor 508, and a communication device 510.

Memory of UI server 502 may include both non-volatile memory 504 and volatile memory 506. Separate devices for non-volatile memory 504 and volatile memory 506 may exist on UI server 502. Non-volatile memory 504 may be configured so that the contents stored therein may be retained across a length of time (e.g., a power cycle, etc.), such that data from previous system use remains available for UI server 502. According to one exemplary embodiment, non-volatile memory 504 may store one or more user profiles, display profiles, communication profiles, or any other type of user or system setting file. Volatile memory 506 may be configured so that the content stored therein may be erased after an event (e.g., a power cycle) or after a period of time (e.g., a specified time limit, erased-as-needed, etc.).

Processor 508 may be a data processing system or other such system configured to control various functions of UI server 502. Processor 508 may include digital or analog processing components and/or be of any past, present, or future design that facilitates control or provides processing features to UI server 502. Processor 508 may be a single data processing device or multiple data processing devices. Processor 508 may be a data processing device having data processing subdevices or components. Processor 508 may include any combination of program software and hardware capable of providing control, display, communications, input features, and output features to UI server 502. Processor 508 may coordinate, control, and/or facilitate the various devices, components, and features associated with UI server 502 and the other components of the system. According to an exemplary embodiment, processor 508 is communicably coupled to non-volatile memory having computer code for executing the processes of UI server 502 described in the present application.

Communication device 510 is generally configured to establish a communication link 512 with an outside source.

According to an exemplary embodiment, communication link 512 is a wired communication link according to a suitable wired protocol and/or technology (e.g., an Ethernet link, a USB link, a an IEEE 1394 link, an optical link, other serial or parallel port technology, etc.). According to various other exemplary embodiments, communication device 510 may be configured to form a wireless communication link. Communication link 512 may be formed such that communication device 510 may be simultaneously connected to multiple sources. Communication device 510 may send and receive one or more of data streams, data strings, data files and/or other types of data (e.g., non-file based data). In various exemplary embodiments, the data files and/or non-file based data may include text, numeric data, audio, video, program data, command data, information data, coordinate data, image data, streaming media, message data, computer code, or any combination thereof.

Figure 6:
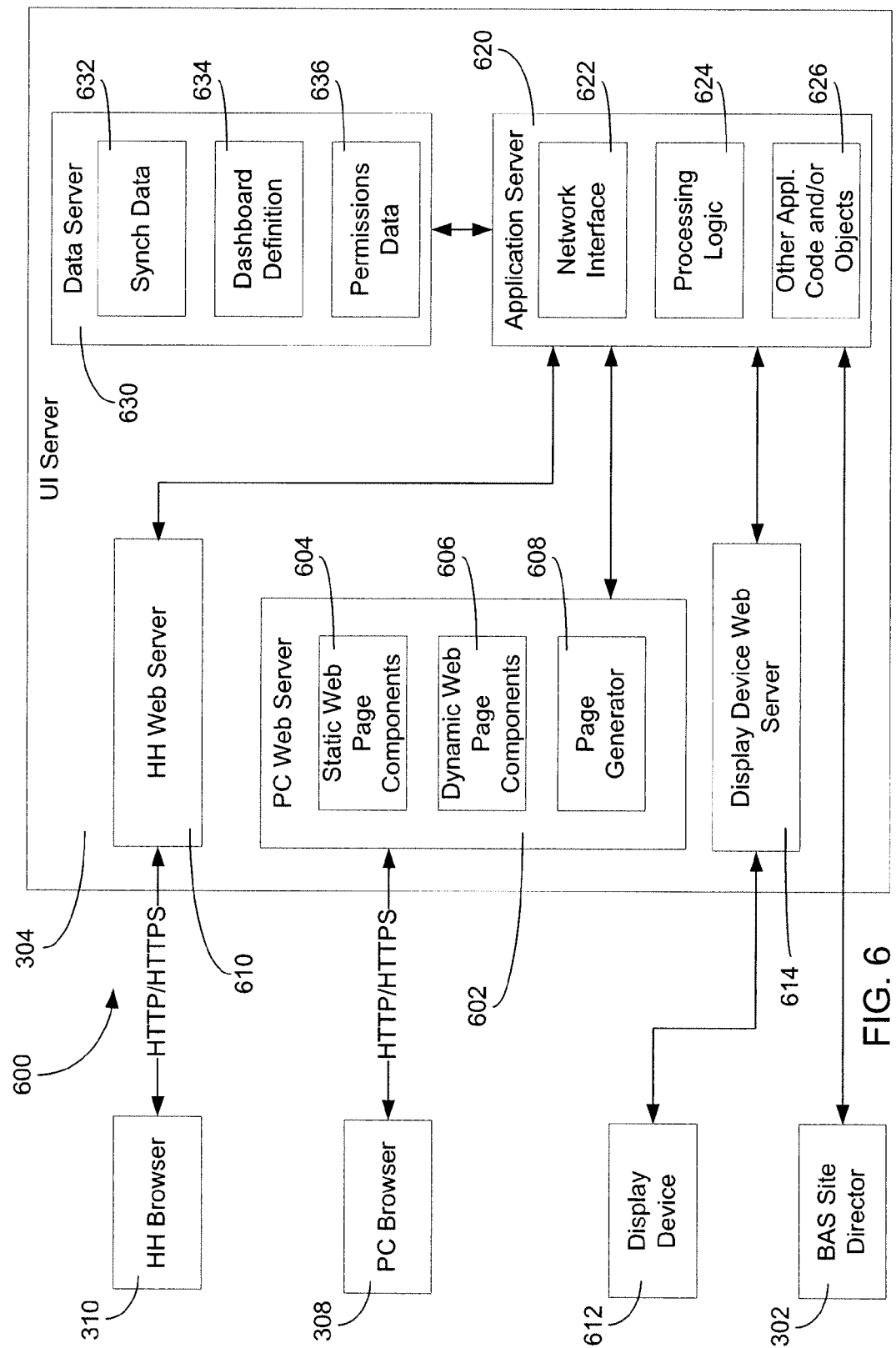
FIG. 6 is a more detailed block diagram of the software components of the UI server of FIGS. 3-4, according to an exemplary embodiment.

Referring now to FIG. 6, a more detailed view of the block diagram of a BAS system 600 including the software components of the UI server of FIGS. 3-4 is shown, according to an exemplary embodiment. UI server 304 may include a PC web server 602, a handheld device (HH) web server 610, an application server 620, and a data server 630.

PC web server 602 may include static web page components 604, dynamic web page components 606, and page generator 608. PC web server 602 may be coupled to PC browser 308 either via a wired or wireless connection. PC browser 308 may communicate with PC web server 602 via a Hypertext Transfer Protocol (HTTP) or other protocol (e.g., secure HTTP or HTTPS). PC browser 308 may provide a display for a user similar to that of the user interface of FIG. 7.

HH web server 610 may generally have the same functionality and components as PC web server 602. HH web server 610 may be coupled to HH browser 310 either via a wired or wireless connection, and may communicate via a HTTP or other protocol. HH browser 310 may provide a display for a user similar to that of the user interface of FIG. 8.

Display device 612 may be any type of device (e.g., a mobile phone) that may be configured to provide a user interface. The user interface provided by display device 612 may be embedded or local to the UI server (e.g., an embedded display, local browser, a local client, etc.). Display device 612 may have a local, wired, and/or wireless connection with display device web server 614. Display device web server 614 may generally have the same functionality and components as PC web server 602 and HH web server 610.

Static web page components 604 may include static data files, image files, text files, hypertext files, and the like. Static web page components 604 may be utilized by page generator 608 and/or dynamic web page components 606. Dynamic web page components 606 may include active server pages, scripts, object code, software modules, files having style definitions, and the like.

Page generator 608 may be configured to parse static and/or dynamic components and to generate an HTML page according to a standard markup language or other format.

Application server 620 is shown to include network interface 622, processing logic 624, and other application code and/or other objects 626. Application server 620 is configured for logical connection to components of BAS site director 302. Application server 620 may interpret commands received from the web server, translate the commands into one or more messages configured for the site director, and send the messages to the site director 302.

Network interface 622 may be computer code for formatting, parsing, sending, receiving, and/or otherwise handling communication messages between components of the system (e.g., BAS site director 302, data server 630, browsers 308, 310, etc.).

Processing logic 624 may include computer code for executing the various methods and processes described in the present application. Application code and/or other objects 626 may include yet other computer code for supporting the user interface activities described herein.

Data server 630 may include synchronization data 632, dashboard definitions 634, and permissions data 636. Data server 630 may be communicably coupled to application server 620. Synchronization data 632 may include data that is synchronized to data and/or information residing on BAS site director 302. When used in this manner, information need not continually be requested from BAS site director 302 as a user is navigating the graphical user interface.

Dashboard definitions 634 may include settings relating to how graphical user interface views should be displayed. Dashboard definitions 634 may include default definitions that define default views for certain user classes, a definition for each user, a default definition set by an administrator, or otherwise.

Permissions data 636 may include rules for defining what information, function, and/or views users or user classes are permitted to use or be shown by the graphical user interface.

Referring still to FIG. 6, the UI server may receive inputs from and send output to one of the browsers via the a web server. When input is received from the user, the web browser may provide further input to application server 620 of FIG. 6, which processes the input and determines a response to the input. A web server of the UI server may receive a response from the application server and use the response to generate one or more GUI elements. Application server 620 may be coupled to BAS site director 302 and data server 630. Application server may facilitate interaction between the web servers and the data stored (e.g., site director 302 and/or data server 630). When a user utilizes the GUI to make a change to a BAS item, the application server may be configured to translate input received from the user via the web server into one or more messages for the site director and/or the data server. For example, if the user utilizes the GUI to change a setpoint for a BAS controller or to temporarily override a schedule, the application server may receive the relevant input, process the input, translate the input into one or more messages for the site director and/or data store, and send the messages. The application may wait to receive a confirmation or other input from the site director before providing a confirmation back to the user via a GUI. It is important to note that any past, present, or future method for communicating queries, commands, and/or other messages may be utilized between the web server, application server, data server, and/or site director.

User Interface Look and Feel

Figure 7:
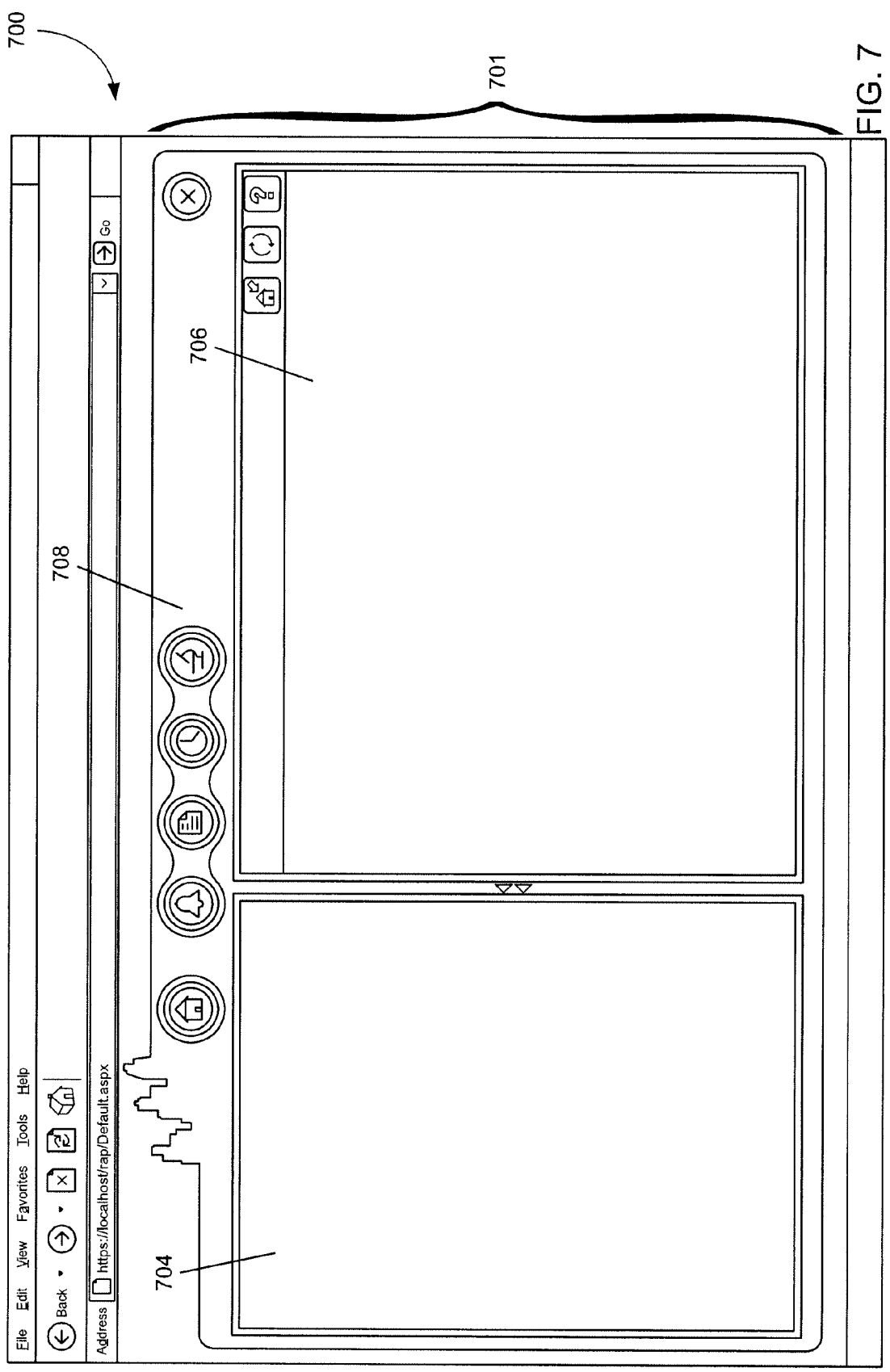
FIG. 7 is a view of a UI for a building automation system, displayed on a device such as a personal computer, according to an exemplary embodiment.

Referring to FIG. 7, a view of a general layout for a GUI 700 that a BAS UI server may be configured to generate is shown, according to an exemplary embodiment. GUI 700 may be a UI for a PC or other device with a relatively full-sized screen. GUI 700 may be configured to accommodate various PC browser screen resolutions, according to an exemplary embodiment.

GUI 700 as shown may be the general layout for a "master" page configured to be the main or first page provided by GUI 700 to a user. The master page may provide a general layout for the various displays and functions of GUI 700 (e.g., logging out, switching between functions, etc.). General responsibilities of the main or master page of GUI 700 may include indicating date and time; indicating the current user (e.g., the username of the account currently logged in); providing access to online help, an "About" box; providing a mechanism for setting, switching, and indicating the UI function mode; limiting available function modes based on the user type and authorization; providing product and/or company information and branding; providing a layout for the user interface; and providing a mechanism for logging out a user.

Various BAS and UI system information may be provided in a variety of views or formats within the UI. The various views may provide actions such as paging, sorting, and filtering to allow users to access desired information. The views may also provide users with standard ways to access help, refresh displayed information, and return to a previous view, among other actions.

Container 701 is shown as part of the UI for the system. Container 701 generally includes selection area 704 and workspace area 706, and may be dependent upon the active function mode of the user interface. For example, in some function modes, selection area 704 may be hidden and container 701 may only include workspace area 706.

Selection area 704 is configured to contain a selection component configured to provide the user with a set of "selection mechanisms" that allow the user to choose the context and/or scope of information to be displayed in workspace area 706.

According to an exemplary embodiment, the selection mechanisms may be selection trees. Selection trees may be tree-type hierarchies derived from navigation views provided by the user interface. The user may select a tree to display, and select a "node" from within the tree to set the selection context for the workspace view within the various function modes of area 706. According to other exemplary embodiments, other tree hierarchies such as a spaces tree (e.g., a tree that defines the buildings, floors, and other spaces in a facility) may be used, or non-tree-based mechanisms may be used (e.g., a list of bookmarked items).

According to one exemplary embodiment, a selection tree (or other selection mechanism) for selection area 704 may be static for a single BAS (e.g., the selection tree may provide all building areas for a user to select). According to another exemplary embodiment, the selection tree may not be static for a single BAS. Rather, user permissions or other user and/or situational attributes may be used to determine the context of the selection tree. For example, administrators may have access to contexts not available to regular users. By way of further example, the system may automatically inspect user permissions to determine that a first selection tree should be provided to a first user and a second selection tree should be provided to a second user.

Workspace area 706 may contain workspace components related to an active function being managed by the user or displayed for the user. Workspace area 706 displays information within the user interface and also provides access to related tasks and user actions.

Tasks are operations that a user initiates in order to properly monitor, operate, maintain, and manage a facility. The view displayed for a particular function by workspace area 706 provides a user with a way to accomplish a set of tasks related to the viewed function, such as viewing a set of information, changing values, overriding schedules, or responding to alerts within the facility system and user interface system. Access to the tasks may be provided by the user interface as a textual or graphical link, menu options, or a selection list within workspace area 706. A task may be accomplished "directly" (e.g., a single mouse click or keyboard stroke) or may require user confirmation and/or input (e.g., user entries within a form). Tasks may be conditionally available based upon the authorization level of the user (e.g., administrator) and the type of information provided by workspace area 706.

Function bar 708 may be designated to display the various function buttons of the user interface. Function bar 708 may include buttons for various function modes of the facility system. For example, buttons may be provided for an alerts function mode, a summary function mode, a schedules function mode, a diagnostics function mode, and a tools function mode.

Function buttons on function bar 708 may be displayed conditionally, and may vary depending upon the type of user detected (e.g., an administrator may be presented with a different set of buttons than a normal user). Additionally, a button may be pre-selected for a particular user (e.g., the one of the buttons may be selected upon startup of the system).

Function modes may be selected using function bar 708. Each function mode may have a default display assigned, and the active function mode may be changed at any time using function buttons of function bar 708.

According to an exemplary embodiment, a "dashboard" function mode may provide a single display and may be a collection of workspace views grouped together for a user as a "home page". According to one exemplary embodiment, the dashboard function mode may be configured to be a default or start-up mode, designated as the active mode upon start-up of the user interface system. The definition and content of the mode may be configured by an administrator or other authorized user of the user interface, according to one exemplary embodiment. The dashboard function mode may provide a layout consisting of one or multiple workspace views.

A dashboard definition may be applied by the user interface to determine the content of the display in the workspace area of the user interface when the dashboard function is active. The dashboard definition may comprise information such as view type, view context, sort settings, component-specific information, which dashboard information is to be viewed in for dashboard layouts with multiple areas, etc. The dashboard view provided by the dashboard function mode may be altered based upon a user selection (e.g., if a user selects an option that results in a new workspace view, the new view is updated in the dashboard function mode).

The alerts function mode may provide workspace views that contain information and provide access to tasks relating to detecting and managing alerts within the facility system. According to one exemplary embodiment, views such as alert summaries may be provided to inform a user of an alert, and/or displays that correlate alerts with potential user actions that may be taken within the system may be provided.

Alert summaries may provide the user of the user interface with alerts that the user is authorized to be provided (e.g., administrators may receive alerts that regular users do not). The summaries may include key information and details of the alert. The summaries may be filtered based on the current selection tree, alert time, or other property if desired, according to an exemplary embodiment. The summaries may additionally provide tasks to a user with tasks relating to responding to the alert. For example, alerts may be viewed, acknowledged, discarded or ignored, etc., and multiple alerts may be managed simultaneously.

The summary function mode may provide workspace views relating to general summary information and provide access to tasks relating to monitoring and managing the operation of the facility system. Summaries may be provided for a workplace, for particular devices and components (e.g., a device summary), for all devices and components (e.g., a "standard summary"), for control systems, etc. Additionally, a user may be able to generate specific views relating to specific criteria provided by the user.

As an example, a standard summary may be provided to the user relating to all facility system items (e.g., devices) that are associated with the current selection made by the user. The summary may include key information relating to each item. The standard summary view may include a method for a user to perform various tasks relating to each item. For example, items may be viewed, values of the item may be changed or altered, and a device summary of the item may be generated and provided. Multiple items may be managed simultaneously.

The device summary that may be displayed via the standard summary may provide a list of facility system items that belong to a selected field device. The device summary may otherwise contain the same information as a standard summary, according to an exemplary embodiment.

The scheduling function mode may provide workspace views relating to providing information and access to tasks related to scheduling features of the facility system. Types of views produced by the scheduling function may include a schedule summary or schedule details view, a view that shows one or more schedules' projected values for a future date, a view that allows a user to modify scheduled events, etc.

A schedule summary view may be provided by the scheduling function mode. The schedule summary may list and provide relevant information for all scheduled items associated with a current selection. The schedule summary may include a method for performing the tasks of viewing the schedules, temporarily overriding a schedule, and displaying details (e.g., a task) relating to the schedule. Multiple schedules may be managed simultaneously.

A schedule details view may also be provided by the scheduling function mode relating to details for a single schedule item. The detailed information may include scheduled items, temporary overrides, projected values, and the schedule's effective period. Tasks relating to the schedule details view may include viewing the details, providing or removing a temporary override, etc. Multiple schedule details may be managed simultaneously.

The diagnostics function mode may provide workspace views relating to diagnostic information and providing access to tasks needed to monitor and evaluate the performance of the facility system. The views may be related to providing trend summaries and trend details, providing "live" data sampling, providing graphical views of display system performance indicators (e.g., providing a view that simply illustrates system performance of a particular system as good, average, or bad), providing "trend study" information, etc.

A trend summary view may be provided for trends configured for items and devices associated with the facility system. The trend summary view may include a view of the list of trends and details regarding a single trend. Trends may be enabled or disabled and multiple trends may be managed and/or viewed simultaneously.

A trend details view may also be provided relating to details for a single trend item and a display of data samples collected by the trend. Trend details may be provided in various types of views (e.g., charts, tables, graphical views, etc.). For example, in a graphical format, the data sampled may be plotted in a chart of values versus time. The data samples may be stored in a historical database. Multiple trend details may be viewed and/or managed simultaneously.

The tools function mode may provide workspace views relating to providing a user with access to information and utility tasks related to the facility system and user interface system. According to one exemplary embodiment, the mode may be restricted to authorized personnel only (e.g., an administrator). A system administration view may be provided by the mode, allowing the user to start and run an update process for the user interface and/or facility system, among other management tasks.

Figure 8:
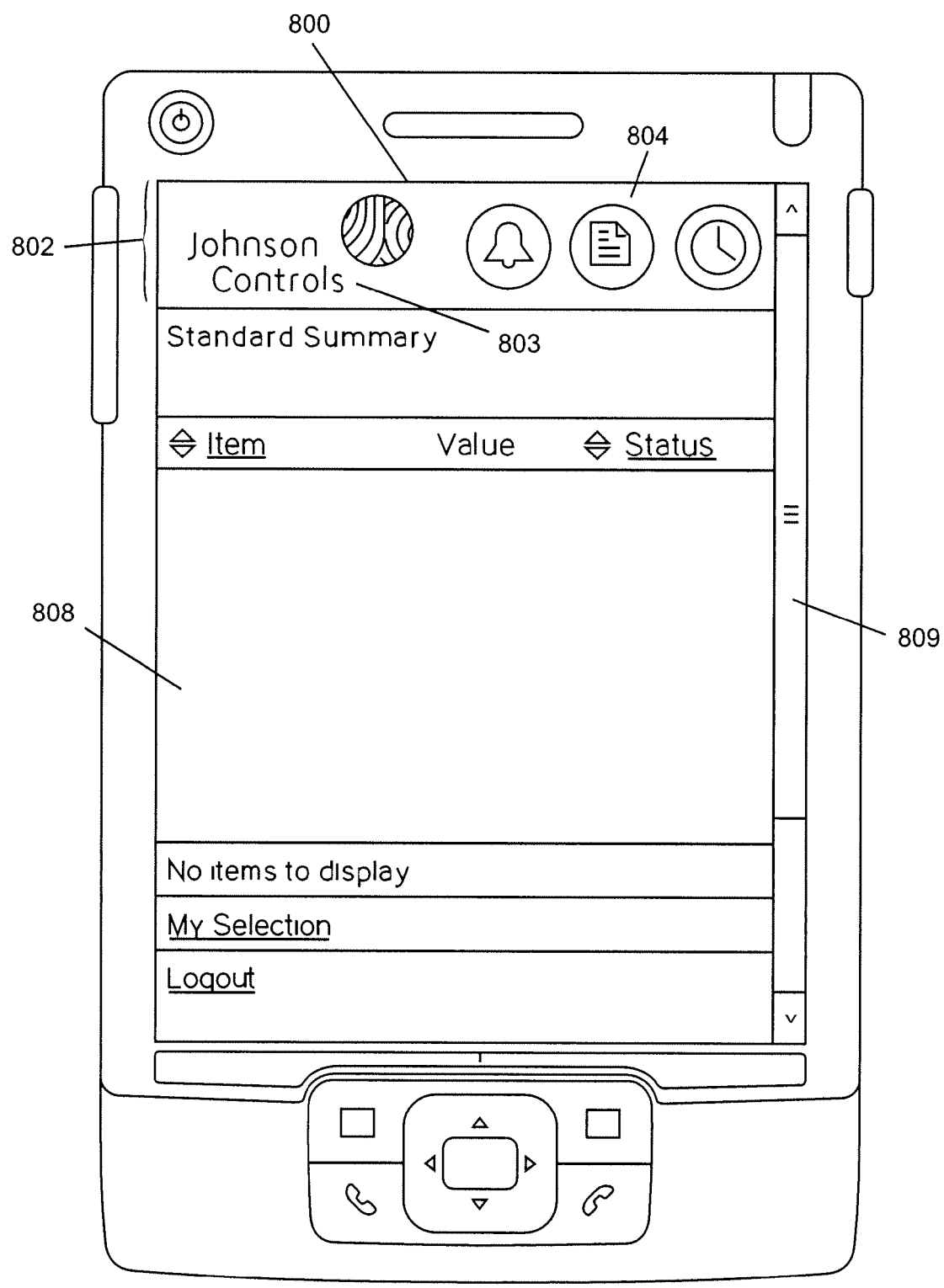
FIG. 8 is a view of a UI for a building automation system displayed on a handheld device, according to an exemplary embodiment.

Referring to FIG. 8, a GUI 800 for display on a handheld device is shown, according to an exemplary embodiment. A handheld display may include a header 802 and a workspace area 808. GUI 800 may be configured to accommodate various browser screen resolutions of the handheld device.

Header 802 is shown to include branding logo 803 and function bar 804. Branding logo 803 may be any identifier, symbol, etc., and may be text-based, graphical based, or any other type of display. Function bar 804 may have similar functionality to function bar 708 of FIG. 7. Function bar 804 may contain more or less buttons than function bar 708, based on the window size of the handheld device and other properties. According to one exemplary embodiment, function bar 804 includes buttons for function modes such as alerts, summaries, and schedules. Header 802 may additionally include other information relating to general usage of the user interface and/or handheld device. Workspace area 808 includes scroll bar 809 for navigation, and may be similar to workspace area 706 of FIG. 7 in terms of functionality.

Task Focused User Interface

Figure 9A:
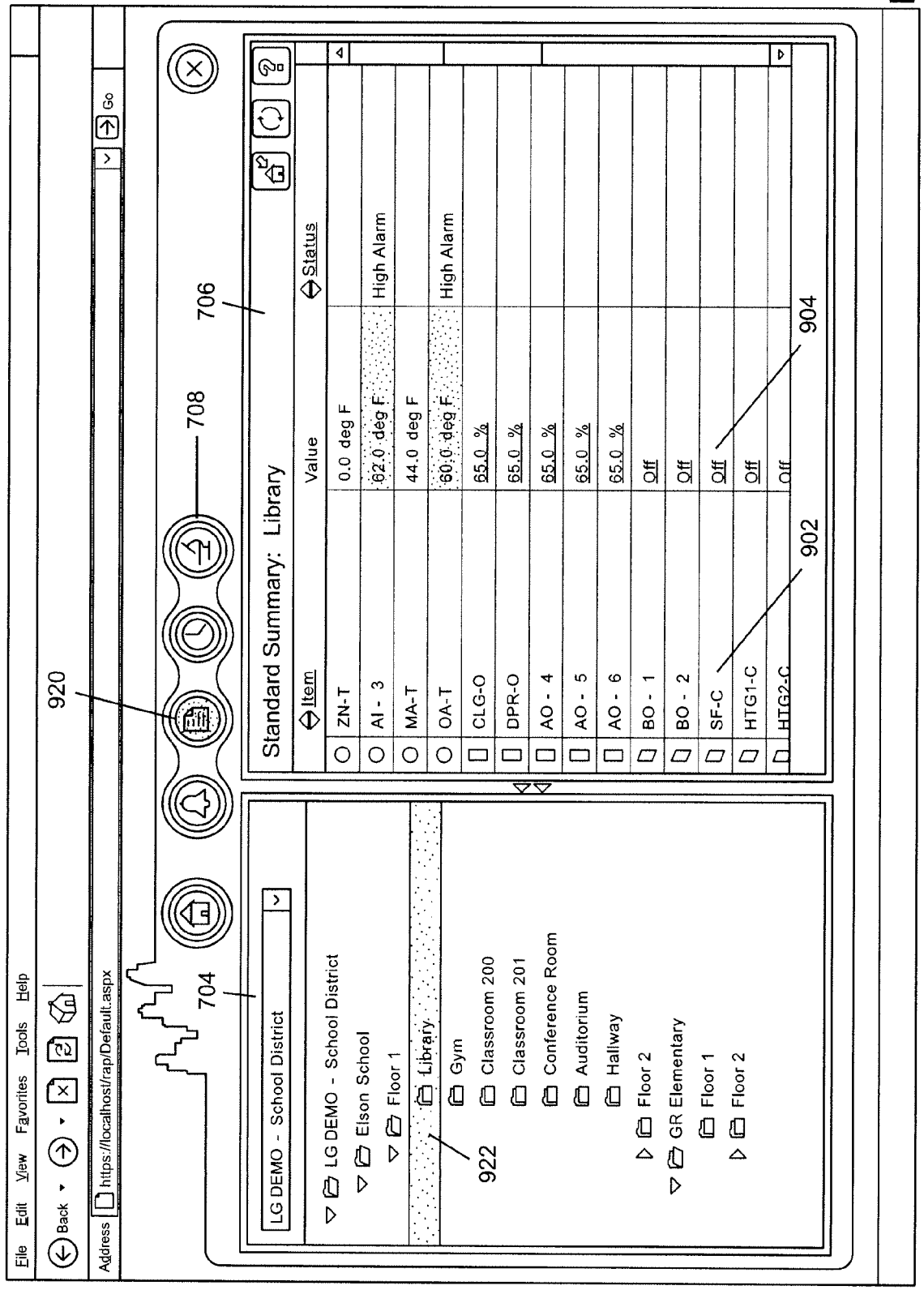
FIG. 9A is a view of a user interface system, according to an exemplary embodiment.

Referring to FIG. 9A, a graphical user interface is shown, according to an exemplary embodiment. The user interface system includes function bar 708, workspace area 706, and selection area 704 as described in FIG. 7.

Function bar 708 includes multiple symbols and indicators for various function modes that may be accessed. For example, in FIG. 9A, a button 920 for a summary mode is shown as highlighted, indicating that the summary mode is the current active mode of the user interface system.

Workspace area 706 may be configured differently based upon the function mode currently selected by a user of the user interface system. For example, for a summary mode, three columns may be shown. According to various exemplary embodiments, the summary mode may include more or less information, rows, and columns.

Selection area 704 displays a selection tree relating to various facility spaces from which information may be viewed. For example, the row 922 for "Library" is highlighted, indicating that the current selection relates to a "Library" space in the facility. Workspace area 706 may display summary information about the "Library" space as a result. The "Library" space may define the context for the items to be displayed in workspace area 706. In other words, the UI server includes logic for generating a workspace area 706 that only includes items relating to the selected context (e.g., the "Library").

One column in the workspace area may be labeled "Item" and may relate to providing the name or other identification of any of the items determined to be displayed in workspace area 706. For example, item 902 is labeled "SF-C" ("supply fan command"), which may be an item name or symbol relating to a supply fan control of the BAS. Another column may be labeled "Value" and may relate to a present value associated with each item. For example, the value may be a numerical value, a percentage, a binary or Boolean value, a string, a temperature, etc., depending on the item type and/or particular item. Value 904 is illustrated as "off" and may represent that item 902 is currently in the off state. One column is labeled "Status" and may relate to status information regarding each item. In FIG. 9A, two items are shown as having a "High Alarm" status indicating potential problems determined by computer logic. For example, computer logic may have determined that the sensed temperatures of items AI-3 and OA-T have varied in a significant way from desired setpoints. The values of the associated items are shown as shaded, providing a user with an additional visual warning. Various colors and shading may be used to identify the items and values (e.g., the color "red" may be used to indicate warnings, the color "orange" may indicate values that have been overridden, the color "black" may indicate items that are offline, etc.), or various other identification techniques may be used.

According to an exemplary embodiment, the UI server is configured to display UI elements for initiating tasks directly with the display of items. For example, underlined values (e.g., value 904) may be hyperlinks or other active UI elements configured to initiate a task relating to the item. Advantageously, using this configuration, a user of the graphical user interface may initiate a task from the same workspace area 706 that he or she may be reviewing for other reasons. It is important to note that not every item and/or value includes an associated task that may be initiated via a UI element.

Figure 9B:
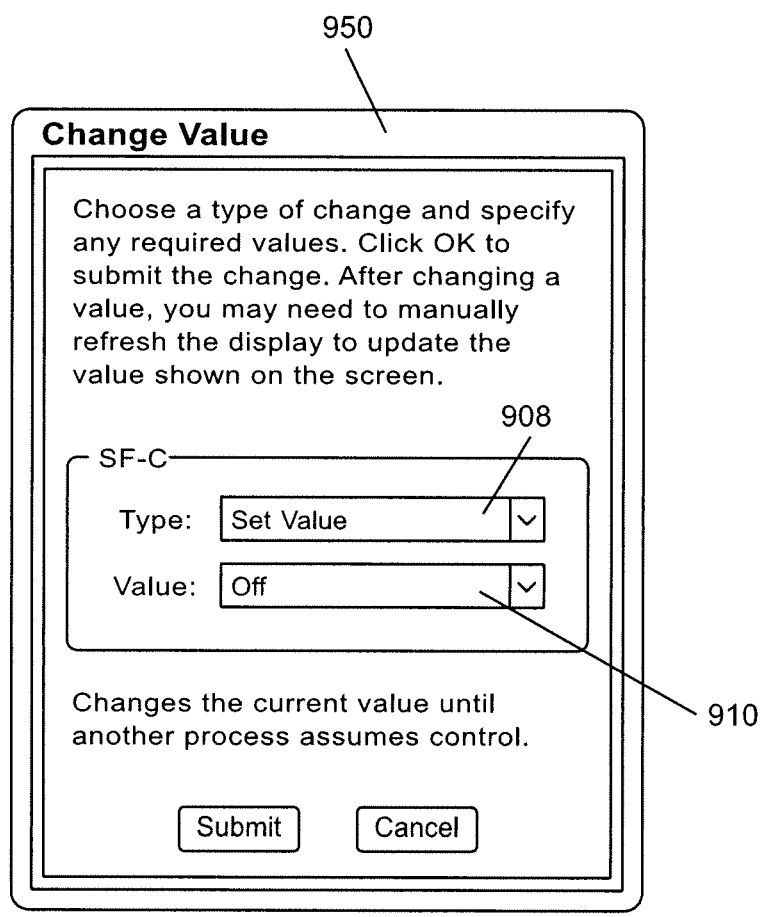
FIG. 9B is a view of a form display generated via the user interface system of FIG. 9A, according to an exemplary embodiment.

Referring to FIG. 9B, a view of a form display 950 that may be generated when the UI element associated with value 904 of FIG. 9A is activated (e.g., clicked, double clicked, etc.) by a user, according to an exemplary embodiment. Using form display 950, a user may be able to change the value for "SF-C," for example. The UI element associated with value 904 may be configured to initiate a task to change a value when activated. Display 950 may be a pop-up form, a new page, a new screen, or some other graphical user interface for displaying the elements shown in FIG. 9A. Advantageously, form display 950 provides plain text instructions for changing the value, identifies the item, and allows the user to select the type of change using UI control 908 and to select the new value using UI control 910.

Figure 9C:
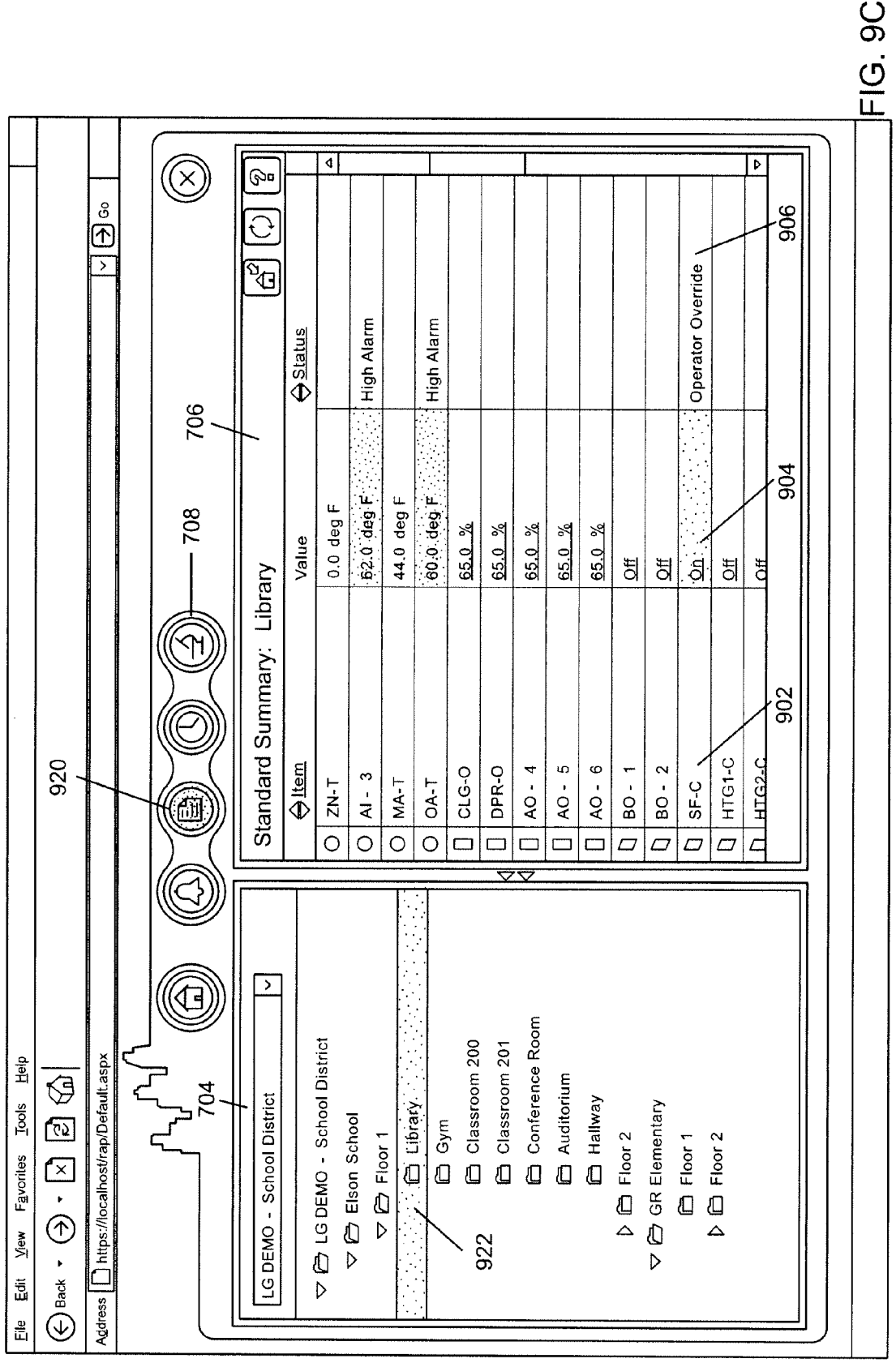
FIG. 9C is a view of an updated user interface system of FIG. 9A, according to an exemplary embodiment.

Referring to FIG. 9C, a view of an updated user interface system of FIG. 9A, after the form of FIG. 9B is submitted, is shown, according to an exemplary embodiment. Using form display 950 of FIG. 9B, the value of item 902 is shown as changed to "On". Value 904 is also illustrated as being highlighted, indicating a change. In addition, status 906 has also changed to "Operator Override" to indicate a change in status based on the change made using form display 950 of FIG. 9B.

Referring generally to FIGS. 10A-10D, another task sequence is illustrated, according to an exemplary embodiment.

Figure 10A:
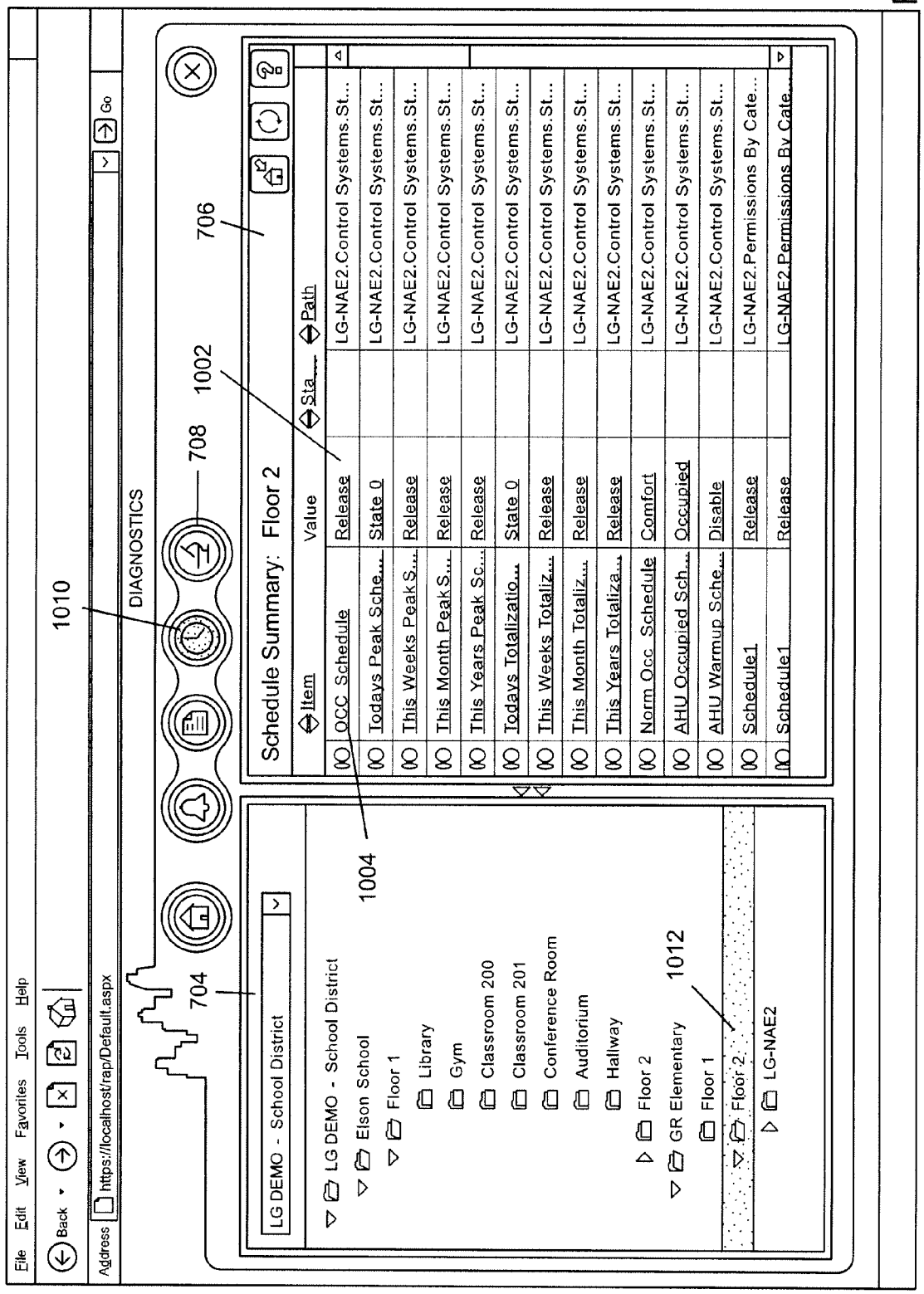
FIG. 10A is a view of a user interface system, according to another exemplary embodiment.

Referring first to FIG. 10A, a view of a graphical user interface system is shown, according to an exemplary embodiment. In the illustration of FIG. 10A, the button 1010 for the schedule function mode on function bar 708 is highlighted, indicating that workspace area 706 is configured to display the schedule function mode of the user interface system. The selected context (e.g., indicated by the highlighted row 1012 of the selection tree) is "Floor 2" of "GR Elementary" of a "School District".

Workspace area 706 is shown to include schedule items determined to relate to the context. Each schedule item may relate to a scheduled event or macro that is stored in the BAS site director. For example, a user may define and store an "Occupancy" schedule. The "Occupancy" schedule may define how BAS setpoints are adjusted according to an expected occupancy schedule for a building space (e.g., "Floor 2"). As the value is listed as "Release," the graphical user interface indicates that the "OCC Schedule" is not currently active or in control of its scheduled items. Logic in the UI server may determine that the user is authorized to change the schedule so that it is controlling. In order to change the schedule so that it is controlling BAS device activity, the user may select (e.g., click, double click, etc.) a UI element associated with value 1002 (e.g., a hyperlink), which is linked to a task to add a temporary override to the system.

Figure 10B:
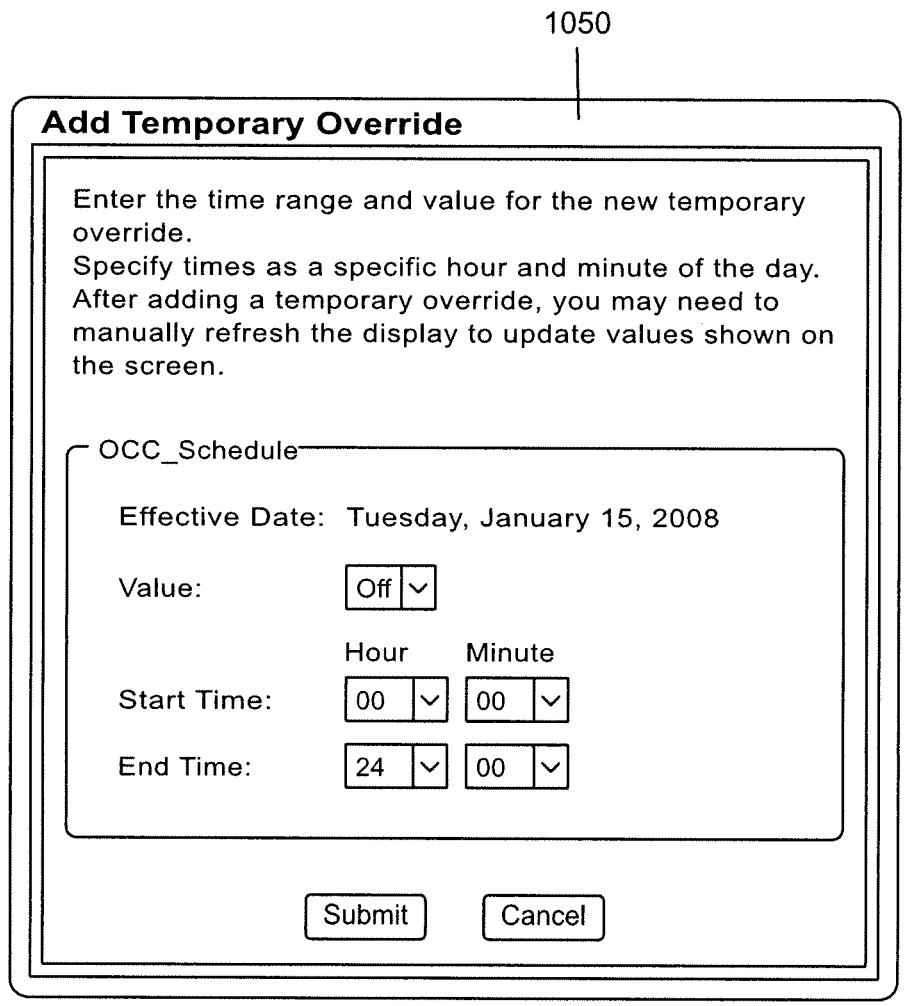
FIG. 10B is a view of a form display generated via the user interface system of FIG. 10A, according to an exemplary embodiment.

Referring to FIG. 10B, when a UI element associated with value 1002 of FIG. 10A is activated, a form display 1050 may be generated and displayed, according to an exemplary embodiment. Form display 1050 may include the ability to change the schedule's controlling value and to specify a time frame during which the value should be in effect.

Referring now to FIG. 10C, a view of an updated user interface system of FIG. 10A is shown, according to an exemplary embodiment. The UI element associated with value 1002 is used to change value 1002 to an "On" state as a result of a change made via form display 1050 of FIG. 10B. A user may select (e.g., click, double click, etc.) item 1004 to access a view schedule details task.

Figure 10D:
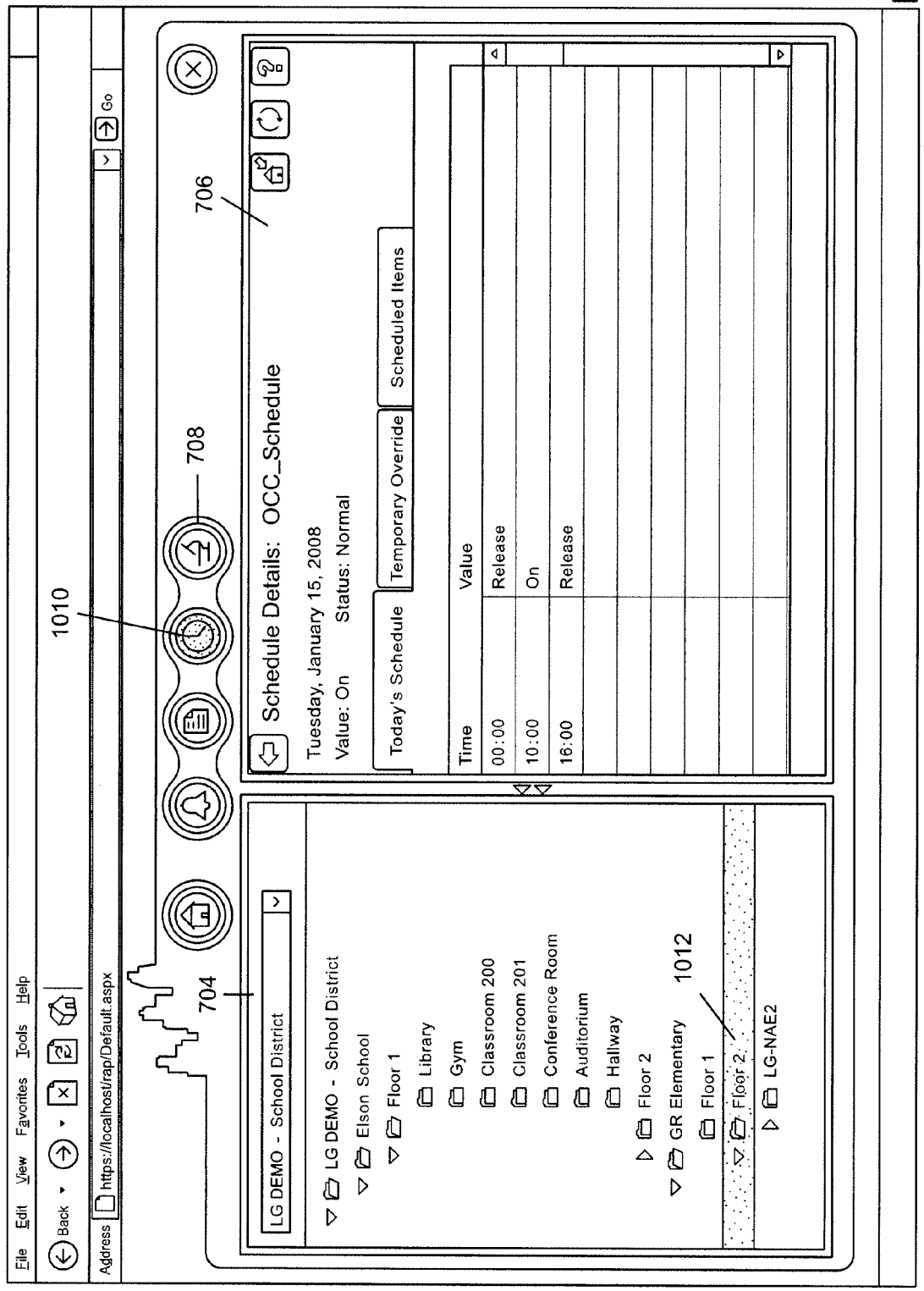
FIG. 10D is another view of a user interface system, according to an exemplary embodiment.

Referring to FIG. 10D, another view of a user interface system is shown, according to an exemplary embodiment. Workspace area 706 shows a schedule details view that may be selected from the workspace of FIG. 10A or FIG. 10C by activating the UI element associated with item 1004. The schedule details view may provide detailed information regarding an individual schedule for an individual item.

Referring generally to FIGS. 9A-10D, the various values, states, and other data provided in workspace area 706 may be changed in various ways. According to one exemplary embodiment, the data may be static (e.g., the data does not update once displayed unless a user operates a user control of the UI). According to another exemplary embodiment, item data may update and refresh without a user input. The UI server may synchronize with the BAS site director at a regular frequency, and may provide the UI with an update. The update may provide changed data for particular items only, or the update may provide all data for all items and the UI may use logic to determine data to update in workspace area 706.

According to yet another exemplary embodiment, the BAS site director and/or UI server may detect changes within the facility regarding data for an item. Upon detection, the BAS site director and/or UI server may "push" the data to the UI server, and an application on the UI server may trigger an update process with the UI such that the data provided on workspace area 706 is updated.

Figure 11A:
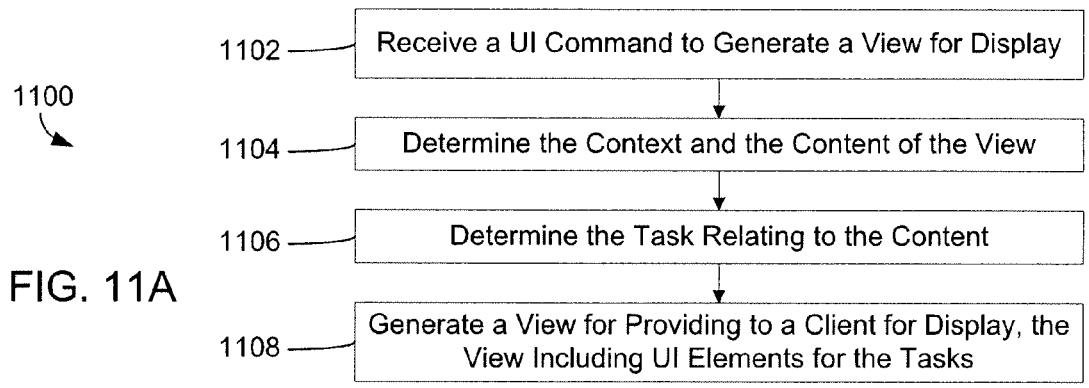
FIG. 11A is a flow diagram of a method of generating a display for a user of the user interface, according to an exemplary embodiment.

Referring to FIG. 11A, a flow diagram of a method 1100 of generating a graphical user interface is shown, according to an exemplary embodiment. A UI command is received to generate a view for display for a user (step 1102). Based upon the command, the context and content of the view may be determined (step 1104). The context may be a building space, device, and/or a collection of related items that the user may wish to be displayed on the user interface. The context may be set based on user selections from a selection tree. The content is information related to the context that is displayed. The content may include items such as schedules, BAS device controllers, BAS devices, or the like.

Tasks relating to the content are determined (step 1106). A view is generated for a user or client of the user interface for display (step 1108) such that a user may view, change, or otherwise manage the tasks. The view may include user interface elements for the tasks of the content.

Figure 11B:
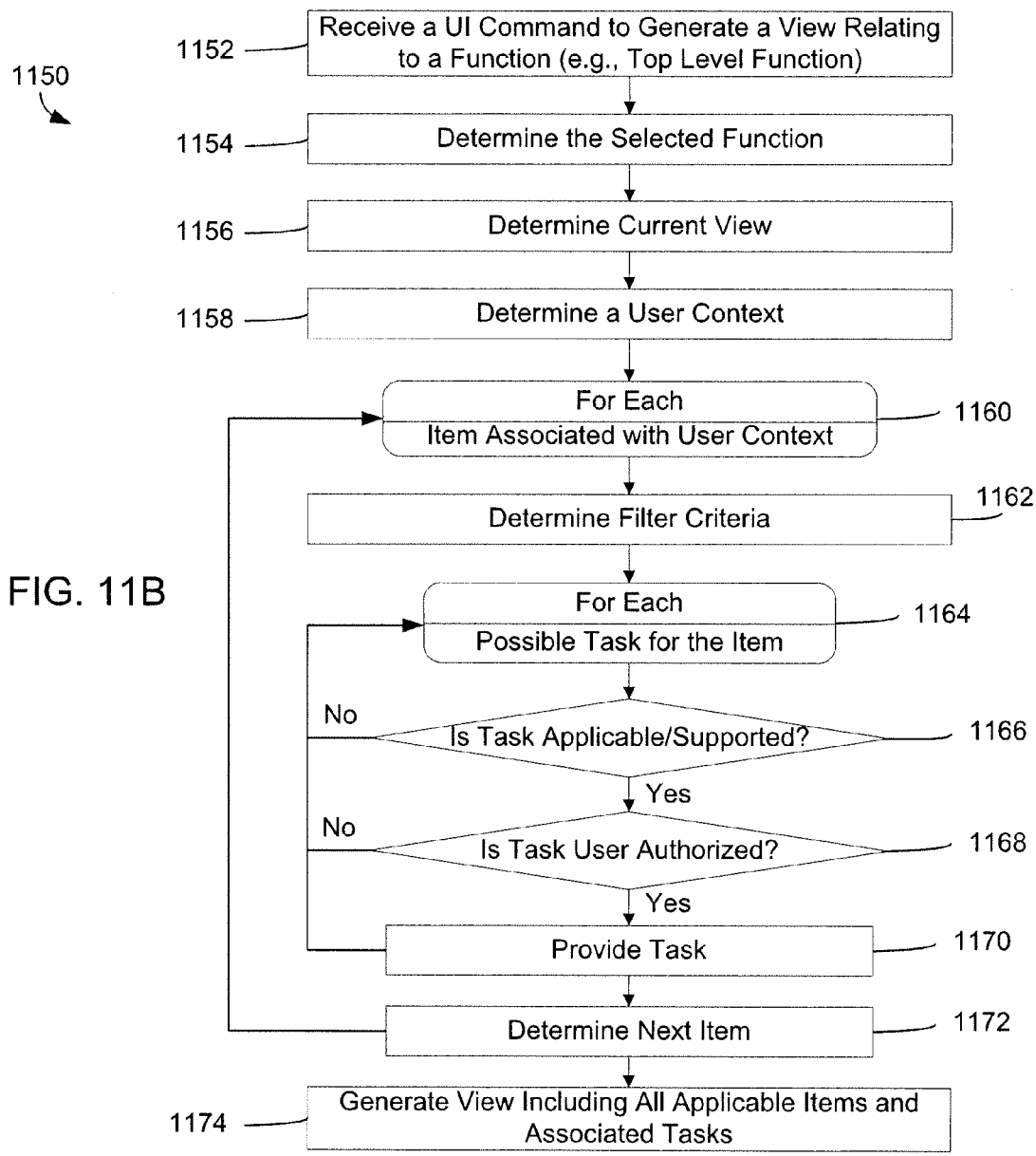
FIG. 11B is a more detailed flow diagram of a method of generating a display for a user of the user interface, according to an exemplary embodiment.

Referring to FIG. 11B, a more detailed flow diagram of a method 1150 of generating a display for a user of the user interface is shown, according to an exemplary embodiment. A UI command is received to generate a view for display for a user (step 1152). The view may be related to a function (e.g., a top level function) of the facility.

The function selected by the user is determined by the system (step 1154). Based upon the selected function, the current task view for the function may be determined by the system (step 1156). The current task view may relate to the view provided in the workspace area of the user interface system. The user context may be determined (step 1158). The user context may relate to a building space, device, and/or a collection of related items that the user may wish to be displayed on the user interface. The user context may be comprised of multiple items (e.g., devices, controllers, sensors, etc.).

Each item of the user context is determined (step 1160). For each item of the user context, filter criteria is determined (step 1162). Filter criteria may be user defined or system defined. Filter criteria may be used to determine if an item should be displayed in the user interface or what properties or components of the item should be displayed.

Each item associated with the user context may have one or more tasks associated with the item (step 1164). For each possible task, a determination is made as to whether the task is applicable or supported by the facility (step 1166) and as to whether the task is authorized to be performed for the current user of the user interface (step 1168). If the steps indicate that the task is not applicable, supported, or authorized for the current user, the task is skipped and the next task is found. Otherwise, the task may be provided to the user of the user interface (step 1170) such that the task may be performed if desired by the user.

Once all tasks are provided or rejected for an item, the next item associated with the user context is determined (step 1172). Once all tasks for all items associated with the user context have been analyzed, a view may be generated on the user interface (step 1174). The view may include all applicable items associated with the user context, including all associated tasks for each applicable item.

Filter Based Activity

According to an exemplary embodiment, workspace area 706 of FIG. 7 may provide a list of all items of a building space or other context. According to another exemplary embodiment, systems and methods to allow a user to filter through all the items to display for a given function and/or context are provided. In other words, a mechanism for allowing a user to define data filters is provided. The data filters result in only a certain selection of items being shown in workspace area 706. For example, a user may be able to filter for a subset of items within a building space, and the result of the search may be provided in workspace area 706, instead of workspace area 706 listing all items within the building space or other context.

According to an exemplary embodiment, filters are created by building a filter definition. A filter definition defines the data to be displayed (in workspace area 706) in the context of a selected building space, user view folder, or other context. A filter definition may be pre-defined by a site administrator or created and/or edited by a user. Pre-stored or created filter definitions may be accessed and/or applied by the user via any number of methods (e.g., filters may be applied via a button press, a custom item on the selection tree, a pop-up menu, a "hot key," or otherwise). According to an exemplary embodiment, filter definitions may be accessible via a folder with a fixed location within the selection component of the user interface. Some filter definitions may apply to any type of function view and/or context. Other filter definitions may be configured to only effect a subset of building spaces or user-defined contexts. One or more filter definitions may be associated with a building space, user view folder, or other context. Furthermore, a single filter definition may be associated with multiple building spaces, user view folders, and/or other contexts.

Filter definitions may be applied to various contexts. For example, a filter definition may be applied to a building space (e.g., a library) and the resulting view in workspace area 706 may relate to the filter definition. If a filter definition does not exist for a particular context, a default view may be provided. Multiple filter definitions may be used for a single context. The filter definition may be adjusted for the type of user interface used (e.g., a UI for a PC may be able to display more details than a UI for a handheld device; therefore, the filter definition may be altered if a handheld device is being used).

Referring now to FIG. 12A, a view of a user interface 1200 for configuring filter definitions is shown, according to an exemplary embodiment. UI 1200 may display (e.g., pop-up) when a user activates a UI element to create a filter definition. According to an exemplary embodiment, a workstation system (e.g., workstation UI/BAS SCT 414 shown in FIG. 4) may be used to generate user interfaces for configuring filter definitions. According to yet other exemplary embodiments, user interfaces for configuring filter definitions may be generated by the UI Server, the workstation UI, or the UI server and the workstation UI. While a variety of user interfaces for building a filter definition may be provided, a row and column based method is provided according to various exemplary embodiments. Such a method may advantageously be intuitive for users given the row and column based output that the application of the filter definition may provide.

Users may begin building a filter definition by creating a row definition. Creating a row definition includes selecting to include certain item requirements (e.g., via control 1202) and/or criteria requirements (e.g., via control 1204) beyond the basic item requirements. For example, as shown in FIG. 12A, the user has selected to require the items to meet the "field controller" requirement. The user has also selected that the items include a name having "VAV" or "FEC" as the first three letters. Further, the user has selected that the field controller be associated with a HVAC and that the reference field for the item contains the string "FEC" or "VAV".

After a row definition is created, a user may continue building a filter definition by then creating a column definition. An exemplary user interface 1250 is shown in FIG. 12B for creating the column definition. Column definitions may be used for further filtering (e.g., excluding of items) or may be used to format and/or select item attributes for display in the results. A user may define a column label (e.g., using control 1252) followed by criteria (e.g. using control 1254) that information displayed in the column must meet in order to be displayed.

Referring yet further to FIG. 12B, columns may be added by clicking button 1256 and removed by clicking button 1258. During creation and/or editing of a filter, definition panel 1260 is updated that displays the presently selected row and/or column criteria of the filter. According to an exemplary embodiment items on definition panel 1260 may not be directly edited but may be selected (e.g., clicked) and then edited using controls such as 1252 and 1254. According to other exemplary embodiments, information on the definition panel is directly editable.

Figure 12C:
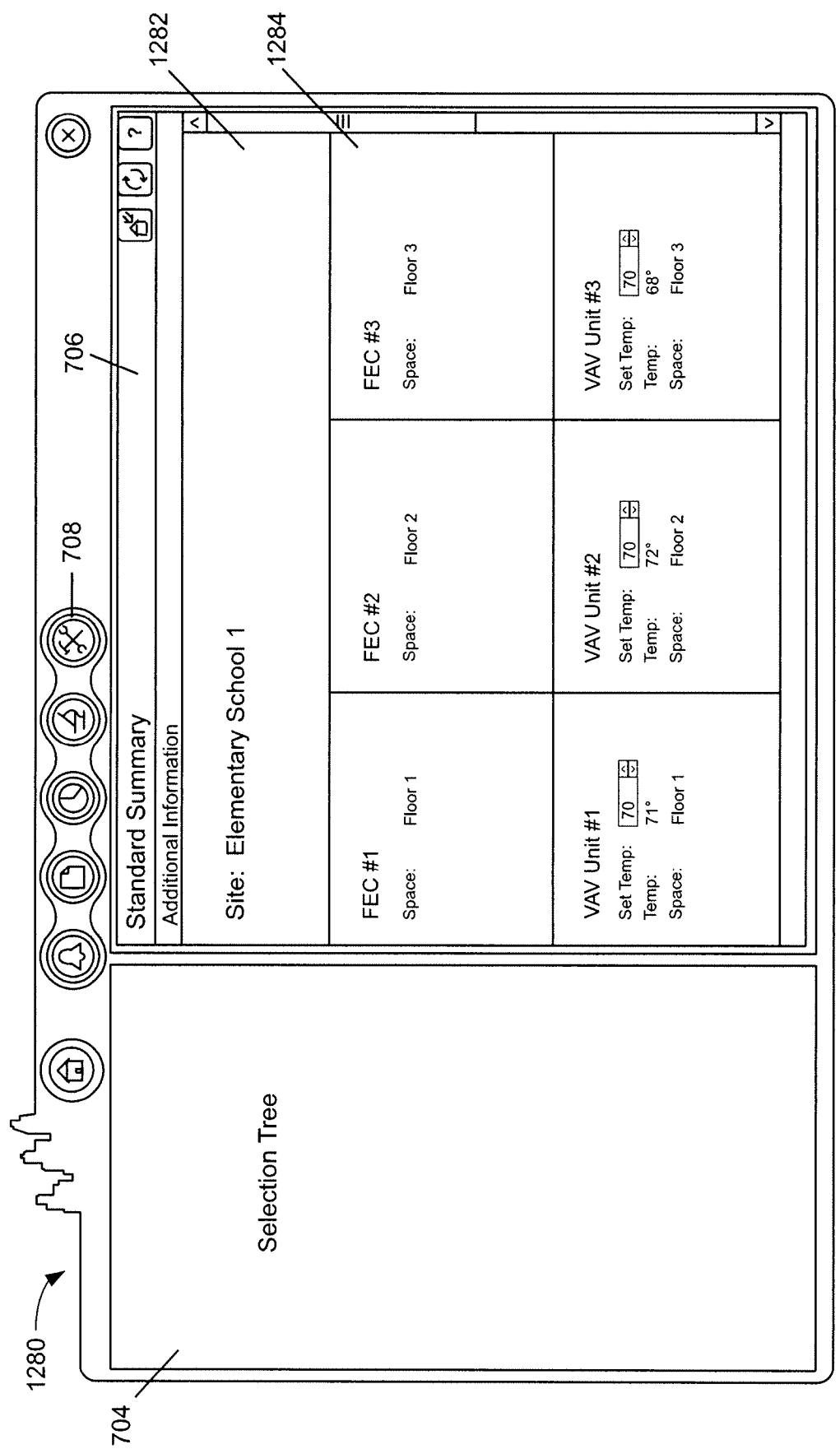
FIG. 12C is a view of a result screen based on operations performed using the user interface of FIGS. 12A and 12B, according to an exemplary embodiment.

Once created and/or edited, the filter definition may be saved via button 1262 or via another method. Filter definitions may be saved for a user and stored in memory of the UI server and/or saved to the site director and periodically synchronized with the site director. Once saved, filter definitions may be applied to selected contexts. An exemplary view of a result screen 1280 is shown in FIG. 12C. Workspace area 706 is shown to include a result area 1284 and an additional information area 1282. Additional information area 1282 may display information falling outside of the filter definition but nevertheless desired to be viewed on the same screen as the results by the user. According to an exemplary embodiment, one or more user interface screens (e.g., pop-ups) may be provided for a user to create an additional information definition that will be associated with one or more filter definitions. In the example shown in FIG. 12C, the user has elected to display the name of the site shown relating to the search results and/or selected in the selection tree. It is important to note that the results need not be displayed in a traditional row column format, but may be tiled (as shown in FIG. 12C) or displayed in some other manner.

Referring generally to FIGS. 12A and 12B, the method of configuring filter definitions may use any type of logic to determine qualifying items based upon the configured filter definitions. For example, in FIG. 12A, the same item ("Name") is shown as accepting two different strings as a valid input. The logic for the filter definition may use a logical OR statement to find all such names that contain either the string "VAV" or "FEC". Once all like items are logically OR'd together as a group, different items may be joined together using a logical AND statement to find all valid items that fit the criteria specified by the user. For example, items that have either the string "VAV" or "FEC" in the "Name" of the item may be logically AND'd together with all items which "Object Category" equals "HVAC".

Referring now to FIG. 13A, a method 1300 is shown for establishing a filter definition that may be used by a UI server (or other component) to filter items to be displayed on a building automation system graphical user interface provided to a client device and for interaction by a user. Method 1300 includes generating a computer based form (e.g., a form shown in FIGS. 12A and/or 12B, a pop-up window, a new screen, a new page, etc.) for allowing a user to enter filter criteria (step 1302). Once the filter criteria is received via the computer form, a filter definition may be created using received filter criteria (step 1304). The filter definition may include a table of filter values, a query string (e.g., a structured query language (SQL) string), object code, computer code, a markup language file (e.g., an extensible markup language file), or another data structure suitable for defining a query or filter. The created filter may then be saved to memory (step 1306). The filter may be saved to a memory associated with the UI server and/or memory associated with the site director. According to an exemplary embodiment, the filter is primarily stored and retained in the site director.

Referring now to FIG. 13B, a further method 1350 for generating the graphical user interface view is shown, according to an exemplary embodiment. The method may supplement FIG. 13A and/or the steps of 13B may be integrated into or between various steps of FIG. 13A. Method 1350 includes providing an interface to associate a filter with a selected building space (step 1352). Method 1350 may further include relating the saved filter to the selected building space (step 1354) and saving the association (e.g., in a text file, relational database, or another data structure). It is important to note that a plurality of building spaces may be associated with the saved filter (e.g., step 1356). Associating multiple building spaces with a filter may be accomplished by copying the filter to and associating the copy with a building space (e.g., by specifically naming the copied filter, by placing the copy of the filter in a folder or other memory location associated with the second building space, by using a relational database, by using a flat text file, or by using any other suitable data structure). Additionally, the same filter may be associated and/or linked to multiple building spaces without copying the filter, allowing a single change to the filter to be applied to all building spaces associated with the filter. Method 1350 may further include providing an interface for allowing the user to choose between automatic application of the filter definition and a standard summary associated with the building space (step 1358). Step 1358 may allow the user to set a "new" default screen or view for a function mode, context, and/or building space. This may advantageously allow the user to initially view only those items he or she is most interested in, rather than all items associated with a function mode, context, and/or building space. The decision regarding the default filter and/or standard summary may be stored in a user profile, a configuration file relating to the user, another configuration file, or another suitable data structure. According to an exemplary embodiment, the system is further configured to copy the filter definition to a first profile (or other configuration file) associated with a first user and a second profile associated with a second user (step 1360). The administrator may be the only user able to conduct such copying or the user may be able to copy his or her created filter definitions to other users' profiles. This feature may advantageously allow users of a building automation system to collaboratively increase the efficiency of the users' experience.

Referring further to FIG. 13B, associating filters with spaces and/or users may include associating a filter with a folder or node of a selection tree. According to an exemplary embodiment, once associated with a folder or node, selecting or activating the filter will include and filter items in subfolders of the folder. According to other exemplary embodiments, the subfolders' folders will also be included in the search and filtered.

Referring now to FIG. 13C, a flow diagram of a method 1380 of a UI server using a filter definition to provide a GUI for a user is shown, according to an exemplary embodiment. According to another exemplary embodiment, the GUI itself may use the filter definition to provide a GUI for a user. The saved filter definition (e.g., the filter definition saved in step 1306 of FIG. 13A) may be applied (step 1382) to a set of building automation system data items. The application may occur, for example, after a user selects a new context that has been associated with the filter, after the user selects the filter for application to a context, after the user selects a new function mode, when a user selects a filter definition, or by any other number of triggering acts. Once applied (manually or dynamically) a graphical user interface or user interface view/area may be generated and provided to the UI, including the results of the applied filter definition (step 1384). The look of the results may approximate that shown in the other Figures or otherwise. The application of a filter definition may include querying a data store and/or site director in a certain way. Alternatively, a complete set of data may be provided from the data store and/or site director and the filter may suppress which results are displayed to the user.

According to an alternative exemplary embodiment, a method of filtering items may be provided in workspace area 706 or elsewhere on the UI such that a user may filter through items or other objects of the facility without navigating through the screens illustrated in FIGS. 12A and 12B, for example. Such a method may allow for dynamic filtering of items listed in workspace area 706. One or more UI controls may be provided on workspace area 706 and/or on another portion of the UI. A user may operate a control, indicating a change in filter preference or otherwise. The list of item in workspace area 706 may dynamically change, updating the list of items provided in "real time". For example, a UI control such as a drop down box may be provided, the drop down box including a list of item types. Upon selection of an item type, the system may exclude all items not being of the selected item type for display.

While the exemplary embodiments illustrated in the figures and described herein are presently preferred, it should be understood that the embodiments are offered by way of example only. Accordingly, the present application is not limited to a particular embodiment, but extends to various modifications that nevertheless fall within the scope of the appended claims.

The present application contemplates methods, systems and products on any machine-readable media for accomplishing various operations. The embodiments of the present application may be implemented using existing computer processors, or by a special purpose computer processor for an appropriate system, incorporated for this or another purpose or by a hardwired system.

It is important to note that the construction and arrangement of the interface components or hardware components as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes, and omissions may be made in the design, operating conditions and arrangement of the exemplary embodiments without departing from the scope of the present application.

Embodiments within the scope of the present application include program products comprising machine-readable media for carrying or having machine executable instructions or data structures stored thereon. Such machine-readable media can be any available media that can be accessed by a general purpose or special purpose computer or other machine with a processor. By way of example, such machine readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures may show a specific order of method steps, it is understood that the order of the steps may differ from what is depicted. Also two or more steps may be performed concurrently or with partial concurrence. Such variation will depend on the software and hardware systems chosen and on designer choice. All such variations are within the scope of the application. Likewise, software implementations could be accomplished with standard programming techniques with rule based logic and other logic to accomplish the various connection steps, processing steps, comparison steps and decision steps.

What is claimed is:

1. A system for filtering items to be displayed on a graphical user interface provided to a client and for interaction by a user, the graphical user interface for a building automation system, the system comprising:
    a processor;
    memory communicably coupled to the processor and including:
        computer code for allowing the user to create a filter definition for filtering building automation system device data points via a computer based form;
        computer code for allowing the user to associate the filter definition with a building space of the building automation system;
        computer code for saving the created filter definition to memory;
        computer code for allowing, after the created filter and association are saved, the user to select the building space from a plurality of building spaces via a user interface element of the graphical user interface;
        computer code for automatically applying the saved filter definition associated with the building space to a set of building automation system data items in response to the selection; and
        computer code for generating the graphical user interface, the graphical user interface including results of the applied filter definition, wherein the results of the applied filter definition reflect a subset of building automation system device data points associated with the building space selected.

2. The system of claim 1, wherein the computer code applies the filter definition by determining whether an item associated with the selected building space should be displayed on the generated graphical user interface and which properties of the item should be displayed on the generated graphical user interface.

3. The system of claim 2, wherein the generated graphical user interface is generated and the item and properties of the item are displayed without receiving a second selection subsequent to the user selection of the building space from the plurality of building spaces.

4. The system of claim 1, further comprising:
    computer code for allowing the user to choose between (a) the automatic application of the filter definition upon user selection of the building space from the plurality of building spaces and (b) a standard summary associated with the building space upon user selection of the building space from the plurality of building spaces.

5. The system of claim 1, further comprising:
    computer code for allowing the user to associate the filter definition with a second building space.

6. The system of claim 1, wherein the computer based form is configured to allow the user to create an "or" condition for the multiple criteria.

7. The system of claim 1, further comprising:
computer code for allowing a site administrator to copy the filter definition to a profile for a second user.

8. The system of claim 1, wherein saving the filter definition to memory includes saving the filter definition to a site director.

9. The system of claim 1, wherein the computer based form is configured to allow the user to select multiple criteria that the set of building automation system data items can meet.

10. The system of claim 1, further comprising:
computer code for allowing the user to select additional information for display with the graphical user interface including the results, wherein the additional information does not otherwise meet the filter conditions.

11. A method for filtering items to be displayed on a graphical user interface provided to a client and for interaction by a user, the graphical user interface for a building automation system, the method comprising:
generating a computer based form and providing the computer based form to the user, the computer based form configured to allow the user to define filter criteria for filtering building automation system device data point;
creating a filter definition using the filter criteria;
generating a first interface for allowing the user to associate the filter definition with a building space of the building automation system;
saving the created filter definition to a memory device;
generating a user interface element for allowing the user, after the created filter and association are saved, to select the building space;
automatically applying the saved filter definition associated with the building space to a set of building automation system data items in response to the selection; and
generating a graphical user interface, the graphical user interface including the results of the applied filter definition, wherein the results of the applied filter definition reflect a subset of building automation system device data points associated with the building space selected.

12. The method of claim 11, further comprising:
determining whether an item associated with the selected building space should be displayed on the generated graphical user interface and which properties of the item should be displayed on the generated graphical user interface.

13. The method of claim 11, wherein the generated graphical user interface is generated and the item and properties of the item are displayed without receiving a second selection subsequent to the user selection of the building space from the plurality of building spaces.

14. The method of claim 11, further comprising:
providing a control for allowing the user to choose between (a) the automatic application of the filter definition upon user selection of the building space from the plurality of building spaces and (b) a standard summary associated with the building space upon user selection of the building space from the plurality of building spaces.

15. The method of claim 11, further comprising:
associating the filter definition with a second building space in response to user input.

16. The method of claim 11, wherein the computer based form is configured to allow the user to create an "or" condition for the multiple criteria.

17. The method of claim 11, further comprising copying the filter definition to a profile for a second user in response to user input.

18. The method of claim 11, wherein saving the filter definition to memory includes saving the filter definition to a site director.

19. The method of claim 11, wherein the computer based form is configured to allow the user to select multiple criteria that the set of building automation system data items can meet.

20. The method of claim 11, wherein the computer based form includes a control for allowing the user to select additional information for display with the graphical user interface including the results, wherein the additional information does not otherwise meet the filter conditions.

21. The method of claim 11, wherein creating a filter definition using the filter criteria comprises:
determining logic for the filter based on the filter definition without requiring the user to specify an 'or' condition.

22. The method of claim 11, wherein the set of building automation system data items is determined by a user selected context.

23. The method of claim 11, wherein the results of the applied filter definition are at least partially based on a user selected context.

24. The method of claim 11, further comprising:
receiving a building space selection from the user;
wherein applying the saved filter definition to a set of building automation system data items comprises determining the set of building automation system data items based on the building space selection from the user.

* * * * *